United States Patent
Nguyen et al.

(10) Patent No.: US 8,411,319 B2
(45) Date of Patent: Apr. 2, 2013

(54) METHODS AND SYSTEMS FOR CONCURRENT RENDERING OF GRAPHIC-LIST ELEMENTS

(75) Inventors: Uoc H. Nguyen, Long Beach, CA (US); James E. Owen, Vancouver, WA (US); Paul R. Henerlau, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 918 days.

(21) Appl. No.: 12/413,667

(22) Filed: Mar. 30, 2009

(65) Prior Publication Data

US 2010/0245858 A1 Sep. 30, 2010

(51) Int. Cl.
*G06K 1/00* (2006.01)
*G06K 9/18* (2006.01)
*G06T 15/40* (2011.01)
*G06F 17/00* (2006.01)

(52) U.S. Cl. ...... 358/1.9; 358/1.12; 358/1.13; 358/1.18; 358/501; 358/520; 358/527; 358/448; 358/462; 358/288; 382/164; 382/173; 382/182; 382/209; 382/291; 345/405; 345/421; 345/442; 345/502; 345/619; 345/629; 715/243; 715/221; 715/222; 715/229

(58) Field of Classification Search .......... None
See application file for complete search history.

(56) References Cited

U.S. PATENT DOCUMENTS

| | | | |
|---|---|---|---|
| 5,293,430 A | 3/1994 | Shiau et al. | |
| 5,459,819 A | 10/1995 | Watkins et al. | |
| 5,555,556 A | 9/1996 | Ozaki | |
| 5,634,089 A | 5/1997 | Kulbida et al. | |
| 5,642,473 A * | 6/1997 | Klotz, Jr. | 358/1.18 |
| 5,649,025 A | 7/1997 | Revankar | |
| 5,687,303 A | 11/1997 | Motamed et al. | |
| 5,717,497 A | 2/1998 | Suzuki et al. | |
| 5,745,596 A | 4/1998 | Jefferson | |
| 5,765,029 A | 6/1998 | Schweid et al. | |
| 5,767,978 A | 6/1998 | Revankar et al. | |
| 5,778,092 A | 7/1998 | MacLeod et al. | |
| 5,850,474 A | 12/1998 | Fan et al. | |
| 5,859,958 A | 1/1999 | Chan et al. | |
| 5,936,634 A | 8/1999 | Kawamoto et al. | |
| 5,995,120 A | 11/1999 | Dye | |
| 6,006,013 A | 12/1999 | Rumph et al. | |
| 6,011,919 A | 1/2000 | Politis et al. | |

(Continued)

FOREIGN PATENT DOCUMENTS

| | | |
|---|---|---|
| JP | 2000-013601 A | 1/2000 |
| JP | 2005-109987 A | 4/2005 |

(Continued)

OTHER PUBLICATIONS

USPTO Office Action—U.S. Appl. No. 12/413,684—Mailing Date Mar. 1, 2012.

(Continued)

*Primary Examiner* — Steven Kau
(74) *Attorney, Agent, or Firm* — Kristine Elizabeth Matthews; David C. Ripma

(57) ABSTRACT

Aspects of the present invention are related to systems and methods for rendering graphical objects in a printing system. According to one aspect of the present invention a graphic list may be partitioned, and the graphic-list partitions may be rendered "out-of-order" or concurrently.

10 Claims, 35 Drawing Sheets

U.S. PATENT DOCUMENTS

| | | | |
|---|---|---|---|
| 6,014,147 A | 1/2000 | Politis et al. | |
| 6,088,480 A | 7/2000 | Sakamoto | |
| 6,137,493 A * | 10/2000 | Kamimura et al. | 345/423 |
| 6,175,650 B1 | 1/2001 | Sindhu et al. | |
| 6,256,104 B1 | 7/2001 | Rumph et al. | |
| 6,268,859 B1 | 7/2001 | Andresen et al. | |
| 6,272,255 B2 | 8/2001 | de Queiroz et al. | |
| 6,275,620 B2 | 8/2001 | de Queiroz et al. | |
| 6,302,522 B1 | 10/2001 | Rumph et al. | |
| 6,324,305 B1 | 11/2001 | Holladay et al. | |
| 6,348,969 B1 | 2/2002 | Ikeda | |
| 6,411,396 B1 | 6/2002 | Benson et al. | |
| 6,625,309 B1 | 9/2003 | Li et al. | |
| 6,711,278 B1 * | 3/2004 | Gu et al. | 382/103 |
| 6,796,730 B2 | 9/2004 | Toda et al. | |
| 6,954,803 B2 | 10/2005 | Stoney | |
| 7,038,815 B2 | 5/2006 | Kuroda | |
| 7,072,076 B2 | 7/2006 | Lapstun et al. | |
| 7,205,959 B2 * | 4/2007 | Henriksson | 345/4 |
| 7,229,224 B2 | 6/2007 | Toda et al. | |
| 7,277,095 B2 | 10/2007 | Beaumont | |
| 7,298,503 B2 | 11/2007 | Christiansen et al. | |
| 7,336,283 B2 | 2/2008 | McCormack et al. | |
| 7,483,036 B2 | 1/2009 | Moore | |
| 8,060,818 B2 * | 11/2011 | Wang et al. | 715/221 |
| 2003/0202212 A1 | 10/2003 | Burgess et al. | |
| 2004/0085559 A1 * | 5/2004 | Danilo | 358/1.12 |
| 2004/0105127 A1 | 6/2004 | Cudd et al. | |
| 2004/0150840 A1 | 8/2004 | Farrell et al. | |
| 2004/0169878 A1 | 9/2004 | Toda et al. | |
| 2004/0190017 A1 * | 9/2004 | Anson | 358/1.9 |
| 2005/0057576 A1 | 3/2005 | Shen et al. | |
| 2005/0067498 A1 | 3/2005 | Smith | |
| 2005/0134886 A1 | 6/2005 | Farrell et al. | |
| 2007/0070088 A1 | 3/2007 | Oishi | |
| 2007/0092140 A1 | 4/2007 | Handley | |
| 2007/0121160 A1 | 5/2007 | Markovic | |
| 2007/0182991 A1 | 8/2007 | Matsuda | |
| 2008/0063277 A1 * | 3/2008 | Vincent et al. | 382/182 |
| 2008/0117450 A1 | 5/2008 | Claiborne et al. | |
| 2008/0137119 A1 | 6/2008 | Clark et al. | |
| 2008/0273218 A1 | 11/2008 | Kitora et al. | |
| 2008/0288860 A1 * | 11/2008 | Daviss | 715/243 |
| 2008/0309954 A1 | 12/2008 | Tsai | |
| 2009/0027402 A1 | 1/2009 | Bakalash et al. | |
| 2010/0245917 A1 | 9/2010 | Nguyen et al. | |

FOREIGN PATENT DOCUMENTS

| | | |
|---|---|---|
| JP | 2006-101390 A | 4/2006 |
| JP | 2006171940 A | 6/2006 |
| JP | 2006-331191 A | 12/2006 |
| JP | 2007-125851 A | 5/2007 |
| JP | 2008-177882 A | 7/2008 |

OTHER PUBLICATIONS

USPTO Office Action—U.S. Appl. No. 12/413,689—Mailing Date Mar. 6, 2012.

USPTO Office Action—U.S. Appl. No. 12/413,663—Mailing Date Mar. 15, 2012.

Japanese Office Action—Patent Application No. 2010-068729—Mailing Date Sep. 27, 2011.

USPTO Notice of Allowance—U.S. Appl. No. 12/413,663—Mailing Date Aug. 24, 2012.

USPTO Notice of Allowance—U.S. Appl. No. 12/413,672—Mailing Date Aug. 21, 2012.

USPTO Notice of Allowance—U.S. Appl. No. 12/413,679—Mailing Date Aug. 17, 2012.

USPTO Notice of Allowance—U.S. Appl. No. 12/413,689—Mailing Date Aug. 22, 2012.

USPTO Office Action—U.S. Appl. No. 12/413,696—Mailing Date Aug. 22, 2012.

USPTO Office Action—U.S. Appl. No. 12/413,679—Mailing Date Feb. 2, 2012.

USPTO Office Action—U.S. Appl. No. 12/413,672—Mailing Date Feb. 2, 2012.

USPTO Office Action U.S. Appl. No. 12/413,696—Mailing Date Feb. 16, 2012.

Japanese Office Action—Patent Application No. 2010-068730—Mailing Date Jan. 10, 2012.

* cited by examiner

METHODS AND SYSTEMS FOR CONCURRENT RENDERING OF GRAPHIC-LIST ELEMENTS

FIELD OF THE INVENTION

Embodiments of the present invention relate generally to methods and systems for rendering data, and more particularly, to methods and systems for rendering graphical objects in a printing system.

BACKGROUND

The processing of an electronic document in a printing system may require computationally intensive operations to interpret and to render print data. A stream of graphic, also considered graphical and graphics, objects may be sent serially from a graphics interface service of a host operating system to a graphics rendering system which may parse the graphical objects and may convert the object-based information into pixel values for printing. The processing of graphical objects to produce pixel values for printing may be referred to as rendering. Fast and efficient systems and methods for rendering may be desirable.

SUMMARY

Some embodiments of the present invention comprise methods and systems for concurrent or "out-of-order" rendering of graphic-list elements allowing for effective and efficient use of multi-core processing platforms, specialized processors, distributed systems and other computing environments.

In some embodiments of the present invention, a graphic list may be partitioned into one, or more, partitions, wherein each partition may be associated with a run, in the graphic list, of graphic-list elements of the same graphical-object type. The partitions may be concurrently rendered, or rendered out of order, and then bit-blit sequentially to a page buffer. In some embodiments, a partition may be rendered on a specialized renderer corresponding to the graphical-object type associated with the partition.

In alternative embodiments of the present invention, a graphic list may be partitioned into two partitions: a first partition comprising all of the graphic-list elements from the graphic list that, when rendered, do not overlap and are not overlapped by any other graphic-list elements from the graphic list; and a second partition comprising any graphic-list element that, when rendered, overlaps or is overlapped by one, or more, other graphic-list elements from the graphic list. The first partition and the second partition may be rendered, and bit-blit, concurrently, or in any order. The graphic-list elements in the first partition may be rendered, and bit-blit, concurrently, or in any order. The graphic-list elements in the second partition may be rendered, and bit-blit, sequentially.

In yet alternative embodiments of the present invention, a graphic list may be partitioned into a first partition comprising all graphic-list elements from the graphic list that, when rendered, do not overlap and are not overlapped by any other graphic-list element from the graphic list. The other graphic-list elements that, when rendered, overlap or are overlapped by one, or more, other graphic-list elements from the graphic list, may be partitioned into spatially disjoint groups of overlapping graphic-list elements. The partitions may be rendered, and bit-blit, concurrently, or in any order. Within a disjoint overlapping partition, the graphic-list elements may be rendered, and bit-blit, sequentially.

In still alternative embodiments of the present invention, a graphic list may be partitioned into partitions associated with z-depth. In these embodiments, partitions may be rendered concurrently, or in any order, but may be bit-blit sequentially.

In some embodiments of the present invention, partitioning of a graphic list may comprise cascaded partitioning according to one, or more, partitioning schemes.

In some embodiments of the present invention, a partition may be sub-partitioned according to one, or more partitioning schemes.

In some embodiments of the present invention, partitions may be processed in relation to available rendering resources for optimal rendering performance.

According to one aspect of the present invention, overlapping rendered graphic-list elements may be detected using a page grid and approximations of the spatial regions associated with the rendered graphic-list elements.

Some embodiments of the present invention may comprise a printer driver wherein a graphic list may be partitioned according to graphical-object type runs of graphic-list elements, and a text-type partition, or partitions, may be rendered and encoded. The printer driving, according to embodiments of the present invention, may compose a print stream of the encoded rendered text partition(s) and the other partitions to transmit to a printer controller.

Some embodiments of the present invention may comprise a printer controller wherein a partition print stream may be received, decomposed, and an encoded rendered text partition, or partitions, may be decoded. Other partitions may be rendered, and all rendered partitions may be bit-blit to a page buffer.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 28:
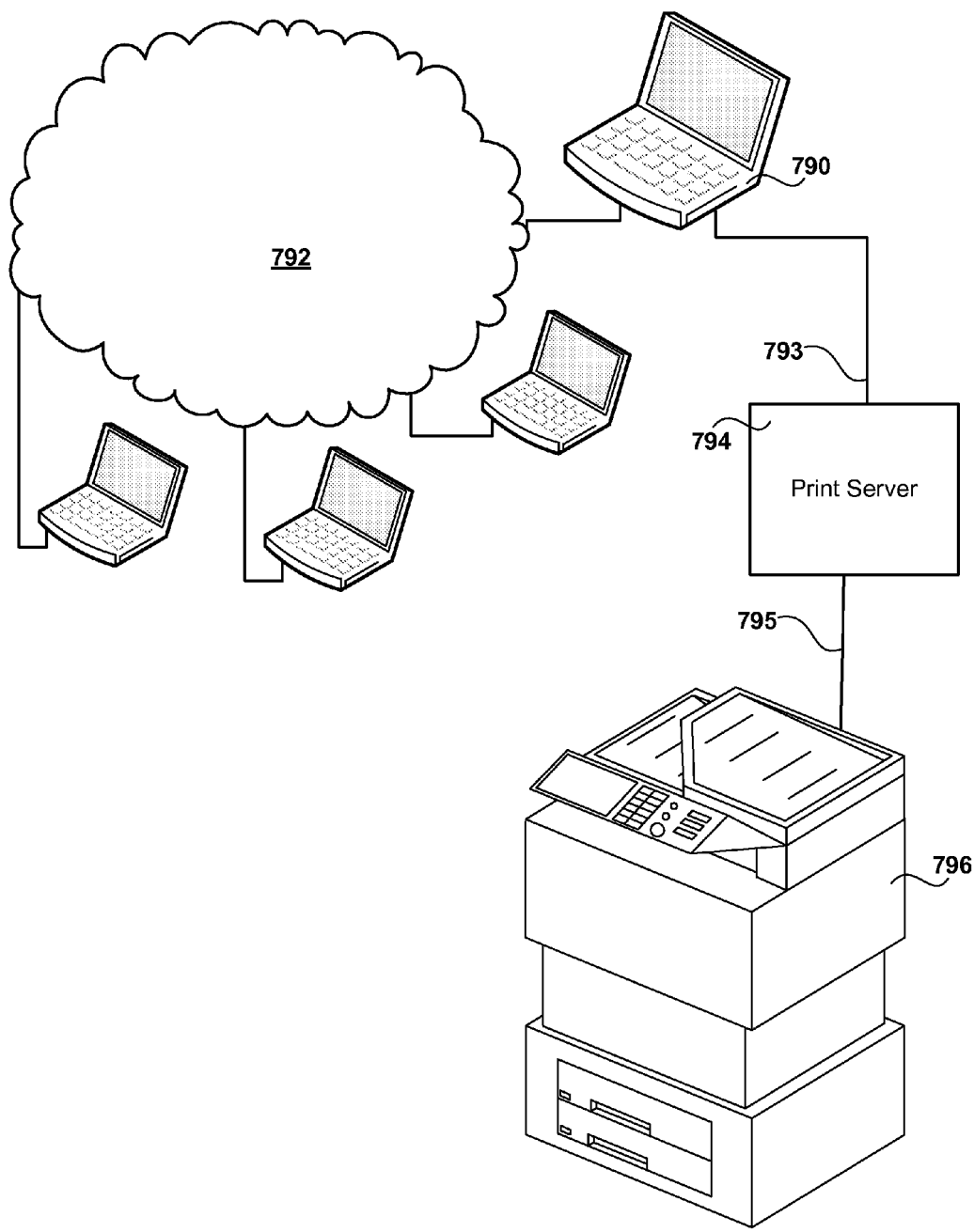
Figure 29:
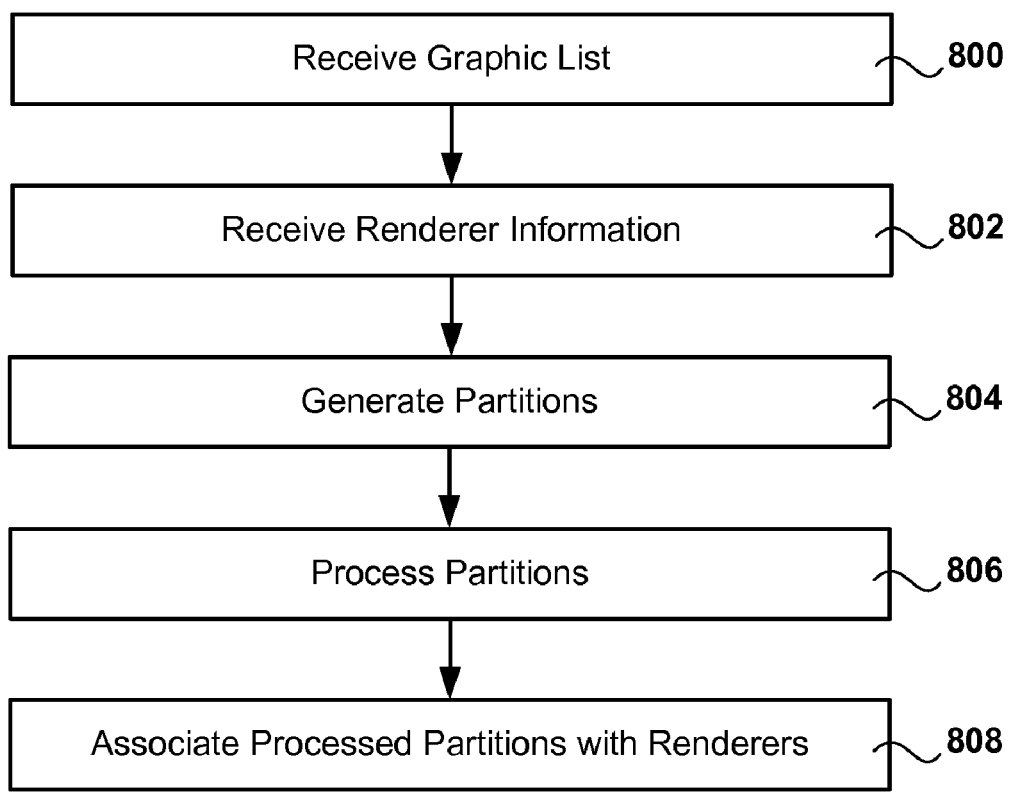

FIG. 28 is a picture showing an exemplary printing system, in which some embodiments of the present invention may operate, comprising a host computing system, which is part of a cloud computing environment, communicatively coupled with a print server communicatively coupled with a printing device; and FIG. 29 is a chart showing exemplary embodiments of the present invention comprising partition processing.

DETAILED DESCRIPTION

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

The processing of an electronic document in a printing system may require computationally intensive operations to interpret and to render print data. A stream of graphic, also considered graphical and graphics, objects may be sent serially from a graphics interface service of a host operating system to a graphics rendering system which may parse the graphical objects and may convert the object-based information into pixel values for printing. The processing of graphical objects to produce pixel values for printing may be referred to as rendering.

A stream of graphic objects may be referred to as a graphic list. Exemplary graphic lists may be, but are not limited to, a display list, a list of DDI (Device Driver Interface) calls, a list of PDL (Page Description Language) elements and other list of graphics. A graphic list may refer to any list of graphic objects. A graphic list may be, but is not limited to being, associated with a page. A graphic list may be, but is not limited to being, associated with a band of a page. A graphic list may be, but is not limited to being, associated with a graphic-list partition.

In an exemplary printing system, an application running on a host computing device may use native, host operating-system (OS) facilities to replay OS graphics commands to a printing device that is communicatively coupled to the host computing device. A printer driver may interpret the OS graphics commands, may modify them and may send them to the printing device using the OS facilities. The printing device may parse the graphics instructions, may perform additional processing and may print the generated output page.

The printer driver may translate the OS commands into a stream of instructions that may be understood by the printing device. In some printing systems, the printer driver may translate the OS graphics commands into print-head instructions. These printing systems may be considered host-based print-processing systems, wherein the print processing may be performed primarily on the host computing device. In alternative printing systems, the printer driver may perform a "thin" translation generating commands nearly identical to the OS graphics commands. In these printing systems, which may be considered printing-device-based print-processing systems, the print processing may be performed primarily on the printing device. Alternative systems to host-based and printing-device-based print-processing systems may comprise hybrid print-processing systems, wherein the printer driver may comprise an intermediate translation, and the print processing may be distributed between the host computing device and the printing device.

A graphical object may be classified as a text object, a vector object or a bitmap object. A text object may comprise a string of characters and associated text attributes. Exemplary attributes may be font, size, color, modifiers, for example, bold, italic, etc., and other text attributes. A vector object, also considered a business graphic or graphical art, may comprise a regular shape, for example, a line, a rectangle, a circle, a polygon or other regular shape, with associated outline and fill values. Exemplary attributes associated with a vector object may be line style, line thickness, line color, fill color, fill pattern and other attributes describing the vector object. A bitmap object, also considered an image or pictorial object, may comprise a height value, a width value and a series of pixel color values. Exemplary attributes associated with a bitmap object may be scale, color and other image attributes.

A graphical object may have an associated transparency level that may control the blending of the pixel values underneath the graphical object with the graphical-object pixel values during rendering of the graphical object. The blending operation may require that the pixel values be in an RGB (Red-Green-Blue) color space, which may preclude direct rendering of blended objects in a CMYK (Cyan-Magenta-Yellow-Black) color space. Performance of other operations, for example, raster operations (ROPs), may be restricted to an RGB color space.

Conventional printing systems may use only one of either the host processor or an embedded processor on the printing device to perform rendering operations and, therefore, may suffer inherent performance limitations. Additionally, with computing processor advances, many host computing devices and printing devices may comprise multiple core processors and/or specialized processors. Exemplary specialized processors comprise graphics cards, digital signal processors (DSPs), graphics ASICs (Application Specific Integrated Circuits) and other specialized processors. Multiple processors and/or specialized processors may not be effectively used in print processing and rendering. Furthermore, limitations of "in-order" rendering of data may make systems that distribute processing to multiple processors inefficient. Therefore, processing resources in a printing system may not be effectively used, and methods and systems for distribution of rendering operations across different processing units, "out-of-order" rendering of graphical objects and concurrent rendering of more than one graphical object at a time may be desirable.

Figure 1:
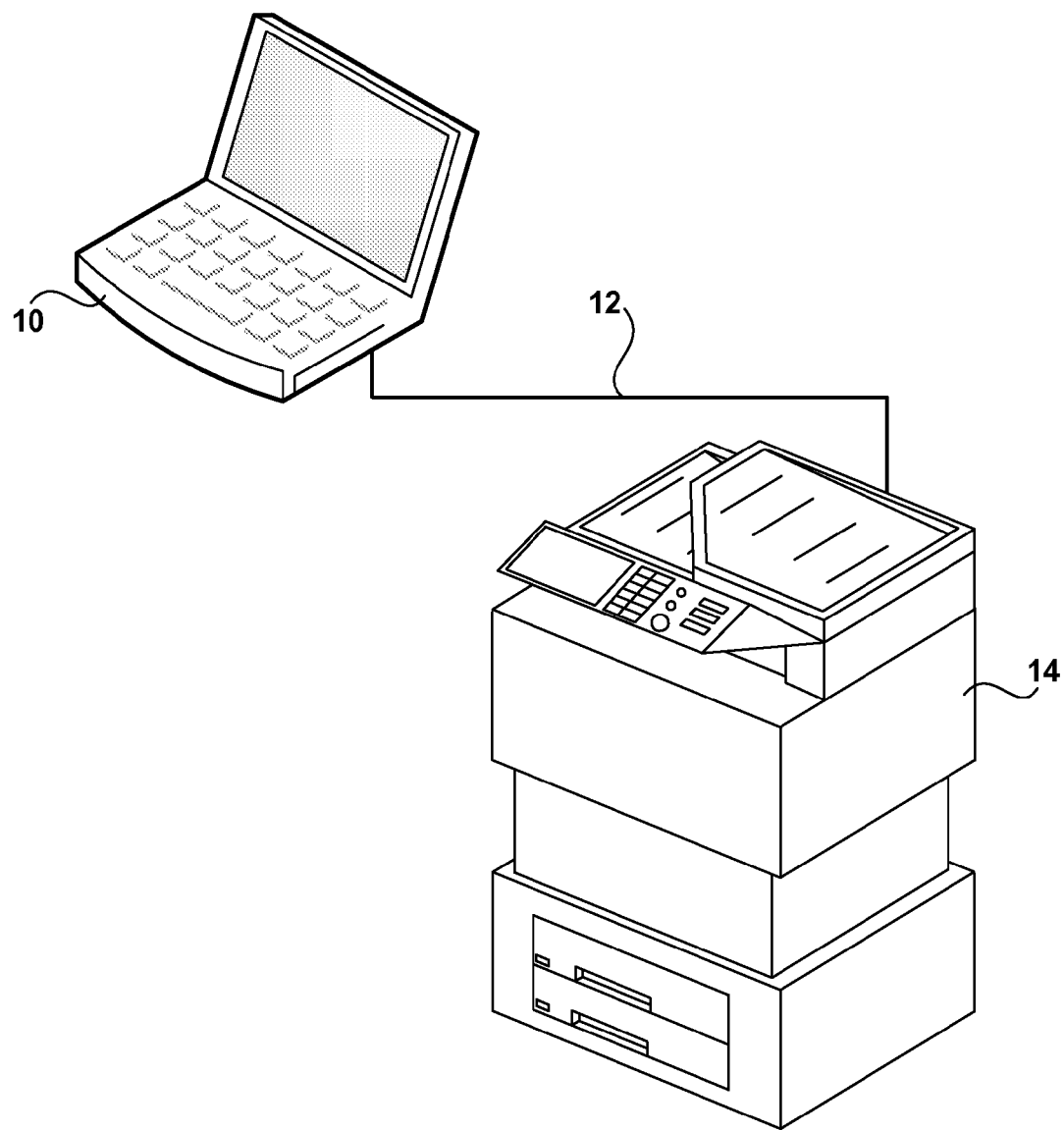
FIG. 1 is a picture showing an exemplary printing system, in which some embodiments of the present invention may operate, comprising a host computing system communicatively coupled with a printing device.

Some embodiments of the present invention comprise methods and systems for the effective use of resources in a multi-processor, printing-system environment. An exemplary printing system, described in relation to FIG. 1, may comprise a host computing device 10 which may be communicatively coupled via a communications link 12 to a printing device 14.

Exemplary host computing devices 10 may be, but are not limited to, a desktop computer, a laptop computer, a tablet computer, a notebook computer, a personal computer, a hand-held computing device, a workstation computer, a computer server, a mainframe computer, a consumer electronics device, for example, a digital camera, a personal digital assistant (PDA), a mobile phone, a cellular phone, and other consumer electronics devices, and other computing devices capable of generating print-job data.

The host computing device 10 may be communicatively coupled to the printing device 14 by any communications link 12. For example, the communications link may be, but is not limited to, a network connection, for example a Local Area Network (LAN) connection, a Wide Area Network (WAN) connection, and an Internet connection, a telephone line (PSTN), a serial cable, or some other wired or wireless communications link.

The printing device 14 may be, but is not limited to, a laser printer, an inkjet printer, a digital copier, a facsimile machine, a single-function imaging device, a multi-function peripheral (MFP) imaging device or other printing device capable of generating a hardcopy document using electronic data.

Figure 2:
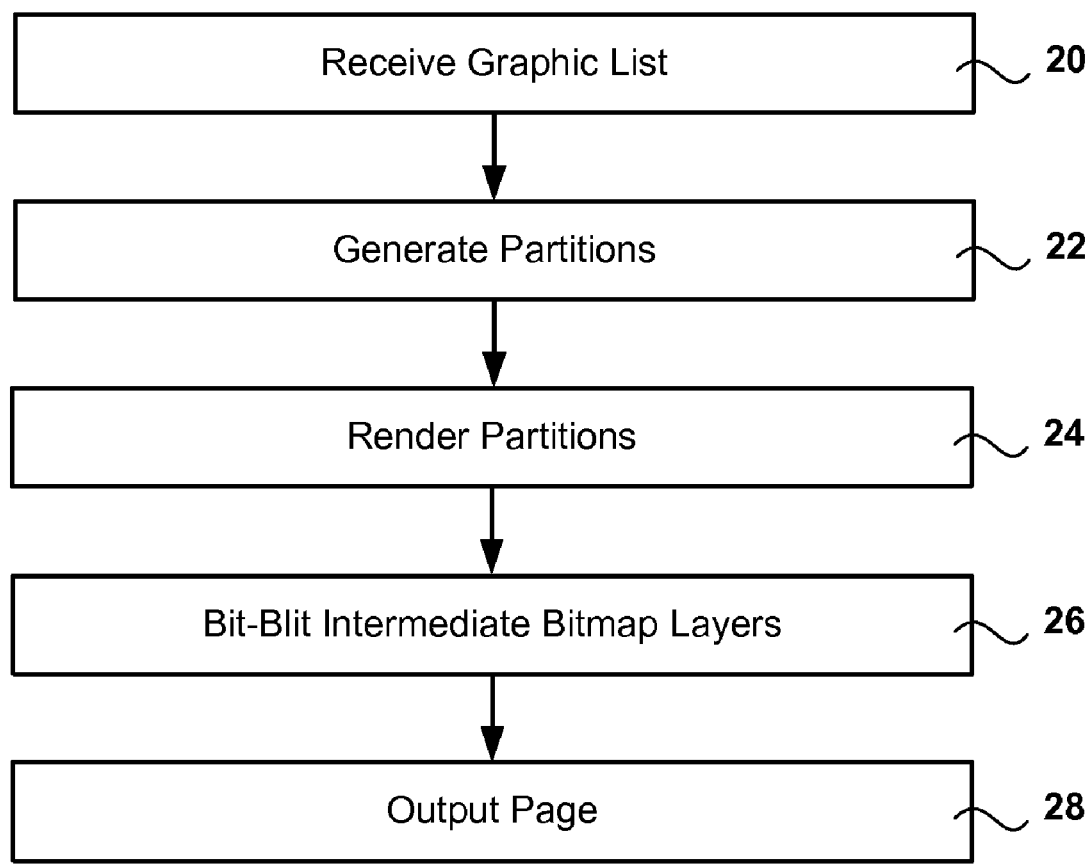
FIG. 2 is a chart showing exemplary embodiments of the present invention comprising partitioning a graphic list into partitions and rendering the partitions.

Some embodiments of the present invention described in relation to FIG. 2 may comprise receiving 20 a graphic list comprising graphic-list elements, generating 22 partitions, also considered layers, associated with the graphic list, rendering 24 the partitions, bit-blitting 26 intermediate bitmap layers and outputting 28 pixel values associated with an output page. In some embodiments of the present invention, graphic-list elements may comprise graphical objects. Bit-blitting 26 may refer to combining two or more bitmaps. Exemplary bit-blit operations may comprise read-modify-write memory operations, memory write operations, memory copy operations and other operations.

In some embodiments of the present invention, each partition may be rendered independently of the other partitions. In some embodiments of the present invention, a partition may be further decomposed into sub-partitions. In some embodiments of the present invention, two partitions may be merged, or otherwise combined, into one partition. In some embodiments of the present invention, a partition may be rendered on a processor which may be optimized for the partition type. In some embodiments of the present invention, a specialized renderer may be used to render a partition. In some embodiments of the present invention, a processor for rendering a partition may be selected based on the complexity of the partition. In some embodiments of the present invention, a processor may be selected for rendering a partition based on the number of graphical objects in the partition. In some embodiments of the present invention, a processor may be selected for rendering a partition based on the size of the area spanned by the partition.

In some exemplary embodiments of the present invention, a partition may comprise a separate copy in memory of a graphic-list element associated with the partition. In alternative exemplary embodiments, a partition may comprise a pointer, into the original graphic list, to a graphic-list element associated with the partition. In yet alternative exemplary embodiments of the present invention, membership of a graphic-list element in a partition may be indicated through a look-up-table associated with the graphic list. In still alternative exemplary embodiments of the present invention, a partition may comprise a base pointer into the original graphic list and a list of offsets to the graphic-list elements that are members of the partition. As appreciated by a person having ordinary skill in the art, there may be numerous methods and systems for storing, and otherwise indicating, a partition.

Figure 3:
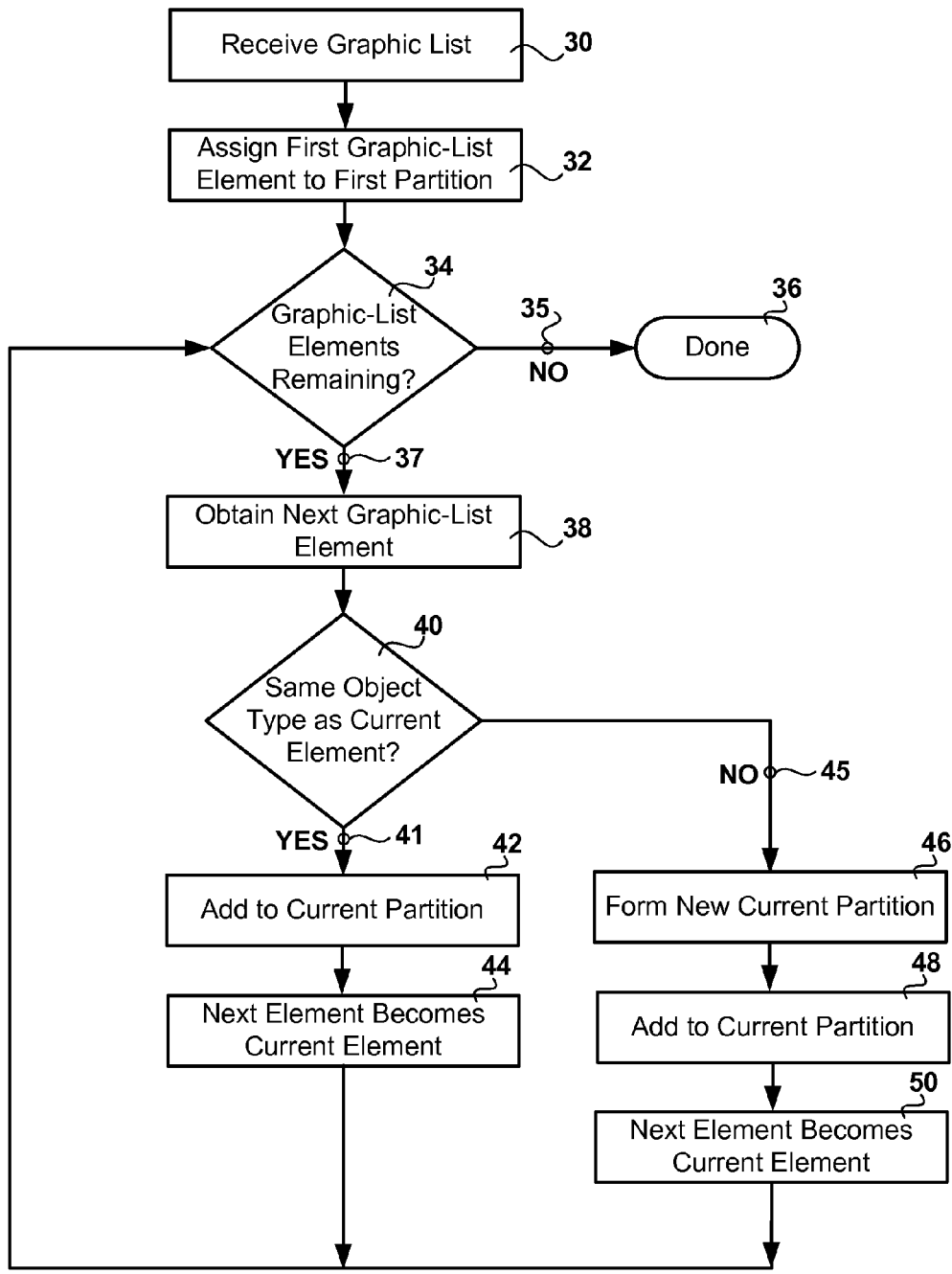
FIG. 3 is a chart showing exemplary embodiments of the present invention comprising generating graphic-list partitions based on runs of graphical objects of the same graphical-object type.

Some exemplary embodiments of the present invention described in relation to FIG. 2 and FIG. 3 may comprise partitioning 22 a graphic list into partitions based on the graphical-object types associated with the graphic-list elements. In these embodiments, a graphic list may be received 30, and the first graphic-list element may be assigned 32 to a first partition. A determination may be made 34 as to whether or not there remain unassigned graphic-list elements. If all graphic-list elements have been assigned 35 to a partition, then partitioning may be terminated 36. If there are graphic-list elements that have not been assigned 37 to a partition, the next graphic-list element may be obtained 38. The object type of the recently obtained, next graphic-list element may be compared 40 to the object type of the current graphic-list element. If the object types are the same 41, then the recently obtained, next graphic-list element may be added 42 to the current partition. The recently obtained, next graphic-list element may become 44 the current graphic-list element for a subsequent comparison, and the graphic list may be checked 34 for unassigned graphic-list elements. If the objects types are not the same 45, then a new partition may be formed 46, and the recently obtained, next graphic-list element may be added 48 to the newly formed, current partition. The recently obtained, next graphic-list element may become 50 the current graphic-list element for a subsequent comparison, and the graphic list may be checked 34 for unassigned graphic-list elements. These embodiments of the present invention may be referred to as "by-object-run-partitioning" embodiments.

In some embodiments of the present invention, graphical-object types may be associated with renderer capabilities. In some embodiments of the present invention, graphical-object types may be associated with graphical-object attributes that correspond to similar processing requirements. Graphical objects which may be processed on a first type of specialized processor may be classified as graphical objects of a first graphical-object type. While graphical objects which may be processed on a second type of specialized processor may be classified as graphical objects of a second graphical-object type. In some exemplary embodiments of the present invention, "by-object-run" partitioning may comprise partitioning a graphic list based on runs of text graphical objects, vector graphical objects and pictorial graphical objects. In these embodiments, the graphical-object types may be: text, vector and pictorial. In alternative embodiments of the present invention, "by-object-run" partitioning may comprise partitioning a graphic list based on runs of color graphical objects and black-and-white graphical objects. In these embodiments, the graphical object types may be: color and black-and-white. In yet alternative embodiments of the present invention, "by-object-run" partitioning may comprise partitioning a graphic list based on runs of outlined graphical objects and non-outlined graphical objects. In these embodiments, the graphical object types may be outlined and non-outlined. In still alternative embodiments of the present invention, "by-object-run" partitioning may comprise partitioning a graphic list based on runs of 3-dimensional graphical objects and non-3-dimensional graphical objects. In these embodiments, the graphical object types may be 3-dimensional and non-3-dimensional.

In some "by-object-run-partitioning" embodiments, a partition may comprise the following information: a partition type, for example, but not limited to, text, vector, pictorial, a rendering order indicating the placement of the partition in the rendering sequence, a processor type or processor number indicating processors which may be used to render the partition, a list of functions which may be performed on the partition, and a partition body comprising the graphic-list elements associated with the partition.

In some embodiments of the present invention comprising "by-object-run" partitioning, a partition may be rendered on a specialized renderer associated with the graphical-object type associated with the partition. For example, text partitions may be rendered on a text renderer, vector partitions may be rendered on a graphical-arts renderer, and bitmaps may be rendered on a pictorial renderer. In alternative embodiments, one or more partitions may be rendered on a general purpose renderer. In some embodiments, a partition may be rendered on a renderer based on renderer availability and other factors.

Figure 4:
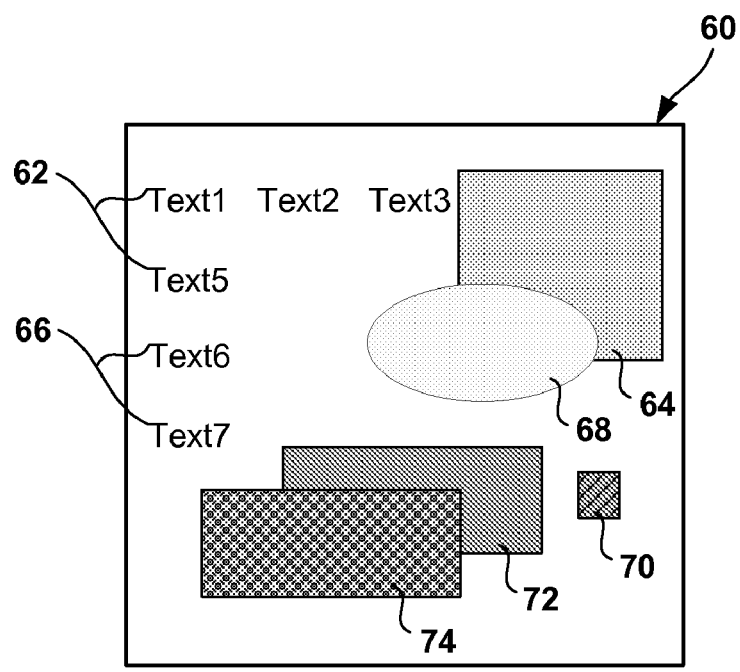
FIG. 4 is a picture showing an exemplary page comprising multiple graphical objects.

"By-object-run" partitioning may be illustrated in relation to an exemplary page 60 shown in FIG. 4. The exemplary page 60 may comprise: a first text graphical object 62 placed first on the page 60, a first vector graphical object 64 placed second on the page 60, a second text graphical object 66 placed third on the page 60, a second vector graphical object 68 placed fourth on the page 60, a first bitmap graphical object 70 placed fifth on the page 60, a third vector graphical object 72 placed sixth on the page 60 and a second bitmap graphical object 74 placed seventh on the page 60. An exemplary graphic list associated with this exemplary page 60 may be given by:

1. DrawText (Text1, Text2, Text3, Text4, Text5) 62
2. DrawRectangle (red) 64
3. DrawText (Text6, Text7) 66
4. DrawEllipse (blue) 68
5. DrawPatch (pictorial_image_1) 70
6. DrawRectangle (green) 72
7. DrawPatch (pictorial_image_2) 74, where "Text4" is occluded by the "red rectangle" 64, colors are illustrated by differing gray levels and images 70, 74 are illustrated by differing hatch-mark lines. The graphic-list elements may further comprise placement location information for each element. This exemplary graphic list may be partitioned according to "by-object-run-partitioning" embodiments of the present invention into seven partitions, wherein each partition comprises a graphic-list element. Exemplary information, according to some embodiments of the present invention, associated with each partition may be given in Table 1.

TABLE 1

Exemplary Partitions Associated with Exemplary Page 60 Shown in FIG. 4

| Partition | Partition Type | Rendering Order | Processor Type | Body |
|---|---|---|---|---|
| 1 | Text | 1 | Text Renderer | DrawText (Text1, Text2, Text3, Text4, Text5) |
| 2 | Vector | 2 | Graphics Art Renderer | DrawRectangle (red) |
| 3 | Text | 3 | Text Renderer | DrawText (Text6, Text7) |

TABLE 1-continued

Exemplary Partitions Associated with Exemplary Page 60 Shown in FIG. 4

| Partition | Partition Type | Rendering Order | Processor Type | Body |
|---|---|---|---|---|
| 4 | Vector | 4 | Graphics Art Renderer | DrawEllipse (blue) |
| 5 | Bitmap | 5 | Pictorial Renderer | DrawPatch (pictorial_image_1) |
| 6 | Vector | 6 | Graphics Art Renderer | DrawRectangle (green) |
| 7 | Bitmap | 7 | Pictorial Renderer | DrawPatch (pictorial_image_2) |

According to some embodiments of the present invention, a first partition may comprise the first graphic-list element, "DrawText (Text1, Text2, Text3, Text4, Text5)," in the graphic list. The first partition may be associated with text-type graphical objects. A second partition may be formed when the second graphic-list element, "DrawRectangle (red)," is examined because the second graphic-list element is not a text-type graphical object. The second partition may be associated with vector-type graphical objects and may comprise the second graphic-list element. A third partition may be formed when the third graphic-list element, "DrawText (Text6, Text7)," is examined because the object type changes from vector to text. The third partition may be associated with text-type graphical objects and may comprise the third graphic-list element. A fourth partition may be formed when the fourth graphic-list element, "DrawEllipse (blue)," is examined because the fourth graphic-list element is a vector-type object and the current (third) partition is associated with text objects. The fourth partition may be associated with text-type graphical objects and may comprise the fourth graphic-list element. A fifth partition may be formed when the fifth graphic-list element, "DrawPatch (pictorial_image_1)," is examined because the fifth graphic-list element is a bitmap-type object. The fifth partition may be associated with bitmap objects and may comprise the fifth graphic-list element. A new partition is again required when the sixth graphic-list element, "DrawRectangle (green)," is received because the object type changes from bitmap to vector. The sixth partition may be associated with vector objects and may comprise the sixth graphic-list element. A seventh partition may be formed when the seventh graphic-list element, "DrawPatch (pictorial_image_2)," is examined because the object type changes from vector to bitmap. The seventh partition may be associated with vector objects and may comprise the seventh graphic-list element.

Figure 5:
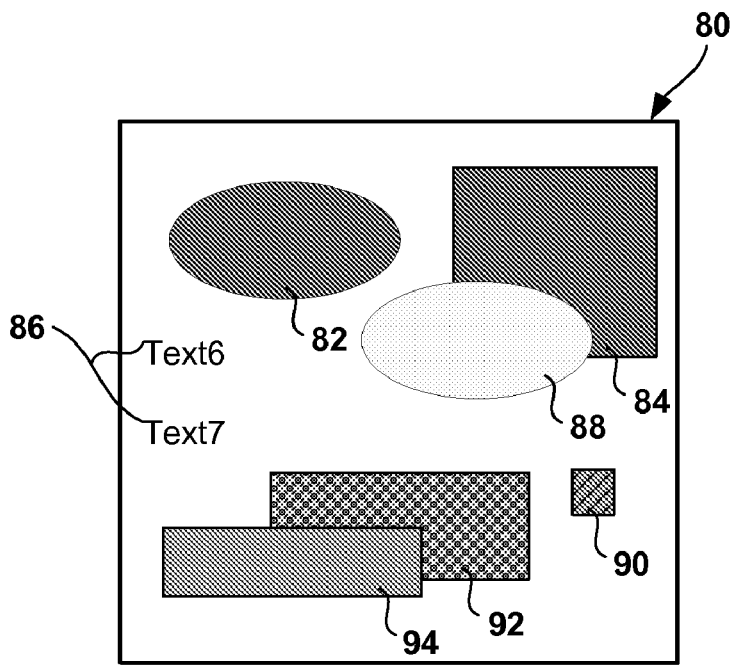
FIG. 5 is a picture showing an exemplary page comprising multiple graphical objects.

"By-object-run" partitioning may be further illustrated in relation to an exemplary page 80 shown in FIG. 5. The exemplary page 80 may comprise: a first vector graphical object 82 placed first on the page 80, a second vector graphical object 84 placed second on the page 80, a first text graphical object 86 placed third on the page 80, a third vector graphical object 88 placed fourth on the page 80, a first bitmap graphical object 90 placed fifth on the page 80, a second bitmap graphical object 92 placed sixth on the page 80 and a fourth vector graphical object 94 placed seventh on the page 80. An exemplary graphic list associated with this exemplary page 80 may be given by:

1. DrawEllipse (red) 82
2. DrawRectangle (red) 84
3. DrawText (Text6, Text7) 86
4. DrawEllipse (blue) 88
5. DrawPatch (pictorial_image_1) 90
6. DrawPatch (pictorial_image_2) 92
7. DrawRectangle (green) 94, where colors are indicated by differing gray levels and images 92, 94 are illustrated by differing hatch-mark lines. The graphic-list elements may further comprise location information for each element. This exemplary graphic list may be partitioned into five partitions. Exemplary information, according to some embodiments of the present invention, associated with each partition may be seen in Table 2.

TABLE 2

Exemplary Partitions Associated with Exemplary Page 80 Shown in FIG. 5

| Partition | Partition Type | Rendering Order | Processor Type | Body |
|---|---|---|---|---|
| 1 | Vector | 1 | Graphics Art Renderer | DrawEllipse (red); DrawRectangle (red) |
| 2 | Text | 2 | Text Renderer | DrawText (Text6, Text7) |
| 3 | Vector | 3 | Graphics Art Renderer | DrawEllipse (blue) |
| 4 | Bitmap | 4 | Pictorial Renderer | DrawPatch (pictorial_image_1); DrawPatch (pictorial_image_2) |
| 5 | Vector | 5 | Graphics Art Renderer | DrawRectangle (green) |

According to some embodiments of the present invention, a first partition may comprise the first and second graphic-list elements, "DrawEllipse (red)" and "DrawRectangle (red)," respectively, since both elements are vector-type elements. The first partition may be associated with vector-type graphical objects. A second partition may be formed when the third graphic-list element, "DrawText (Text6, Text7)," is examined because the third graphic-list element is not a vector-type graphical object. The second partition may be associated with text-type graphical objects and may comprise the third graphic-list element. A third partition may be formed when the fourth graphic-list element, "DrawEllipse (blue)," is examined because the object type changes from text to vector. The third partition may be associated with vector-type graphical objects and may comprise the fourth graphic-list element. A fourth partition may be formed when the fifth graphic-list element, "DrawPatch (pictorial_image_1)," is examined because the fifth graphic-list element is a bitmap-type object and the current (third) partition is associated with vector objects. The fourth partition may be associated with bitmap-type graphical objects and may comprise the fifth graphic-list element. When the sixth graphic-list element, "DrawPatch (pictorial_image_2)," is examined, it may be added to the current (fourth) partition because it is the same object type as the object type that is associated with the fourth partition. The fourth partition may further comprise the sixth graphic-list element. A fifth partition may be formed when the seventh graphic-list element, "DrawRectangle (green)," is examined because this graphic-list element is a vector-type object and the current partition (fourth) is associated with bitmap-type graphical objects. The fifth partition may be associated with vector objects and may comprise the seventh graphic-list element.

In "by-object-run-partitioning" embodiments of the present invention, rendering 24 of the partitions may occur concurrently or "out-of-order" on multiple rendering processors. In some embodiments, a processor on which a partition is rendered may be selected based on the graphical-object type associated with the processor. The resultant rendered partitions may be bit-blit 26 sequentially, wherein intermediate bit-blitting may be performed concurrently. For example, for six rendered partitions denoted P1, P2, . . . , P6, the bit-blit may be performed sequentially in the order P1, P2, P3, P4, P5, P6. Alternatively, P1 and P2 may be bit-blitted sequentially forming an intermediate bit-blit result denoted P1P2. P3 and P4 may be bit-blitted sequentially forming an intermediate bit-blit result denoted P3P4, and P5 and P6 may be bit-blitted sequentially forming an intermediate bit-blit result denoted P5P6. Three bit-blitters may form these intermediate results concurrently, and the intermediate bit-blit results may be bit-blit sequentially in the order P1P2 P3P4 P5P6. Still alternatively, P1, P2 and P3 may be bit-blit sequentially forming an intermediate bit-blit result denoted P1P2P3, and P4, P5 and P6 may be bit-blit sequentially forming an intermediate bit-blit result denoted P4P5P6. These intermediate results may be bit-blit sequentially in the order P1P2P3 P4P5P6. Sequential bit-blit may refer to in-order bit-blit between adjacent partitions and in-order bit-blit between intermediate bit-blit results. Therefore, in some embodiments of the present invention, sequential bit-blitting may be performed by concurrent intermediate bit-blitting.

Figure 6:
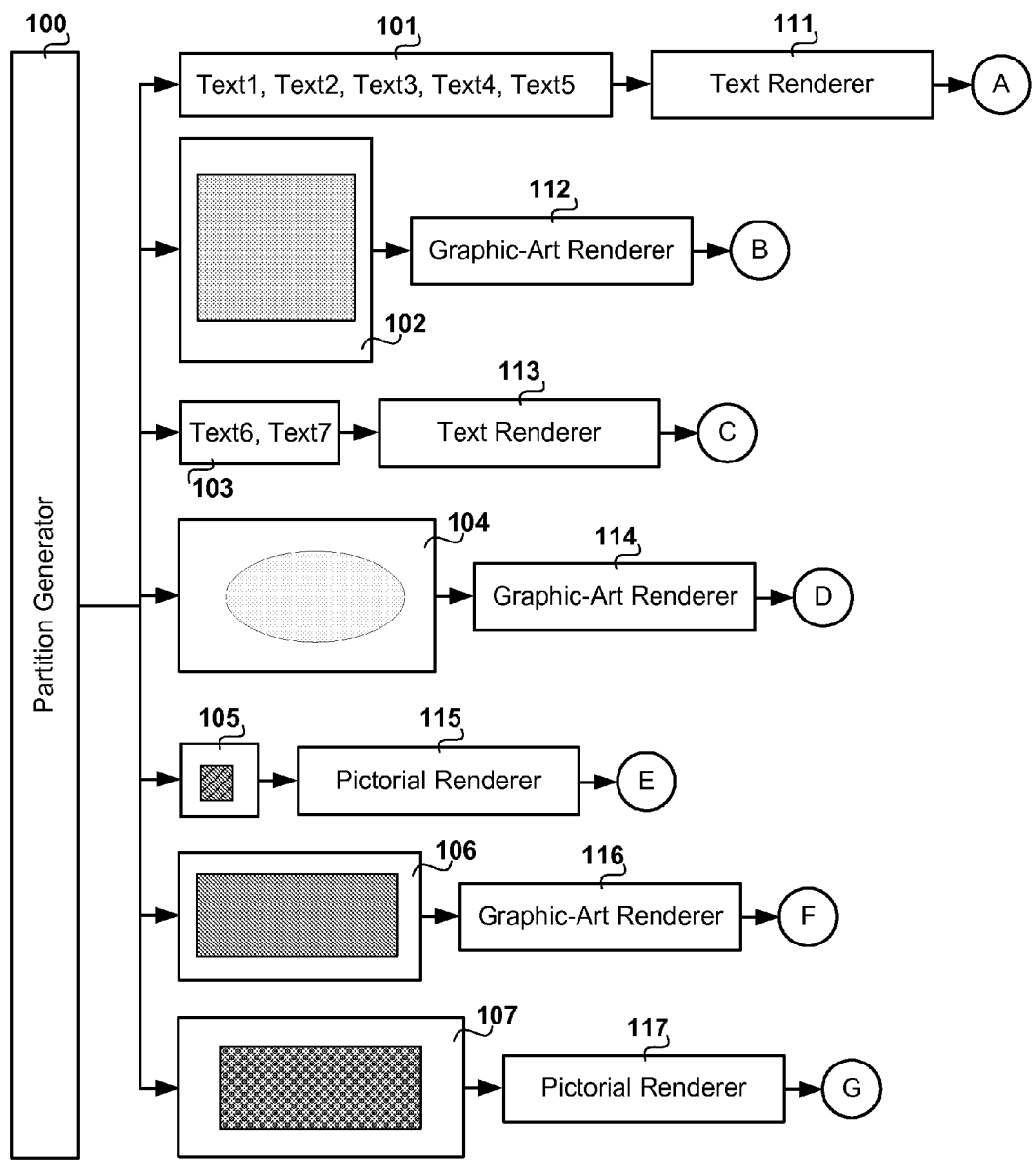
FIG. 6 is a picture illustrating rendering of the exemplary page shown in FIG. 4 according to exemplary embodiments of the present invention wherein graphic-list partitioning may be based on runs of graphical objects of the same graphical-object type.
Figure 6:
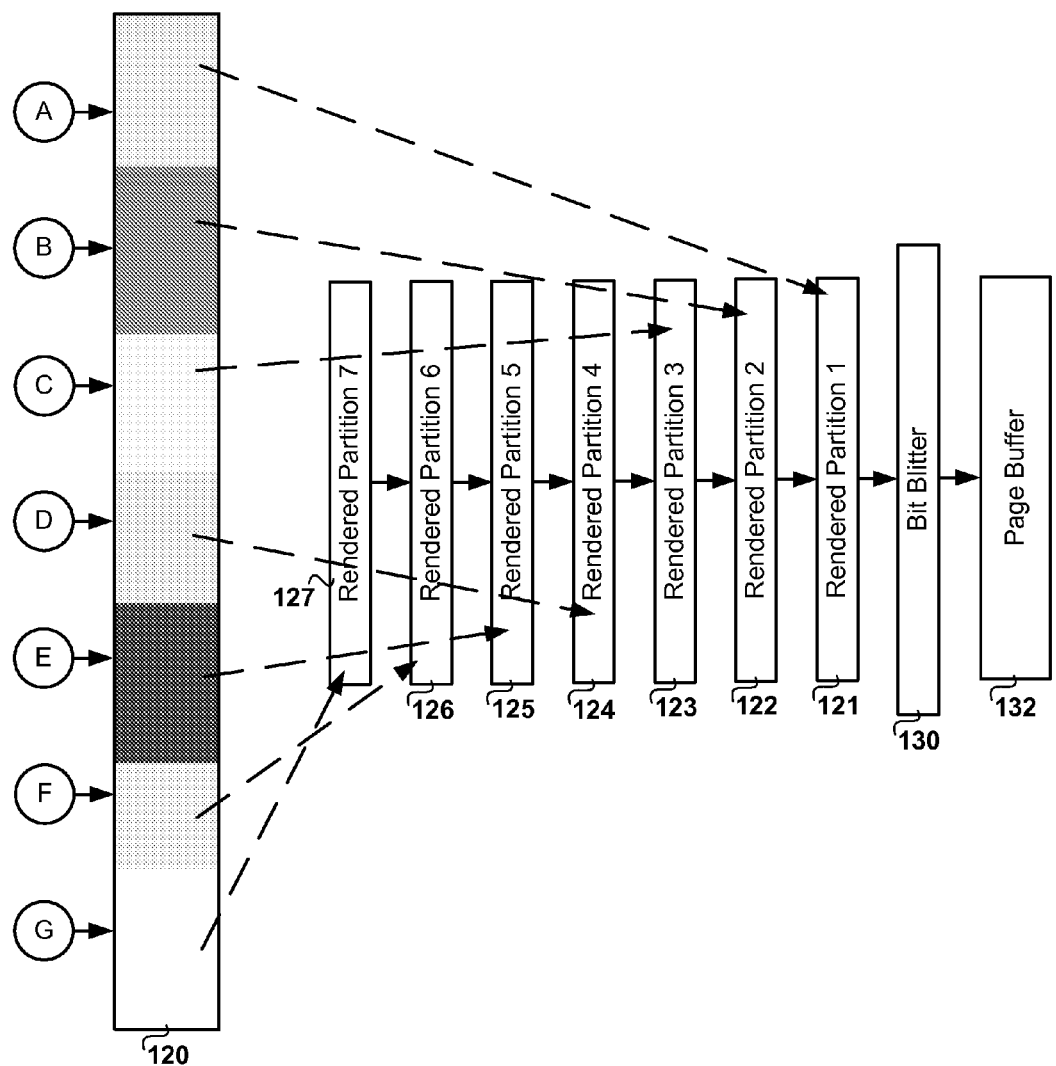
Figure 7:
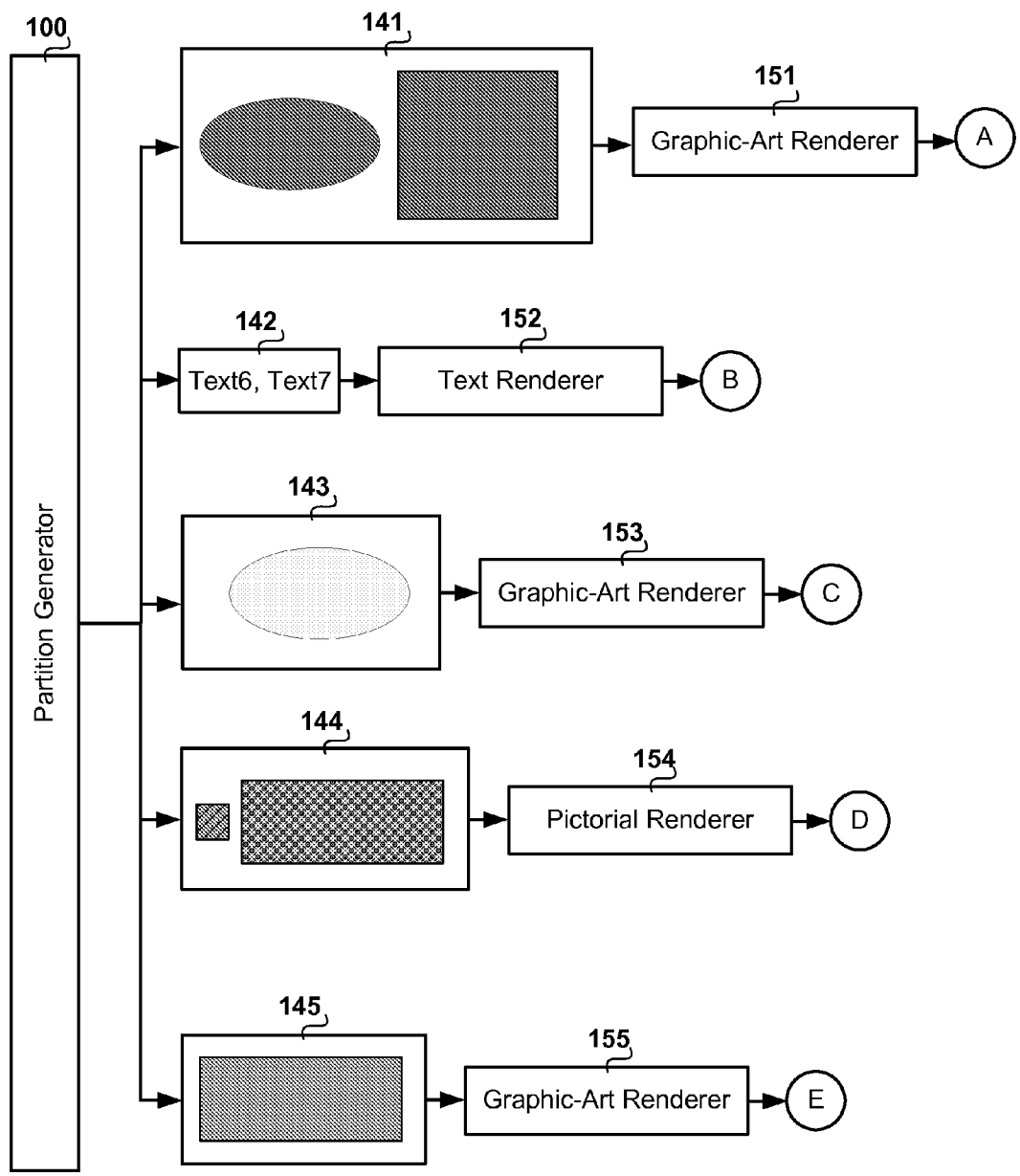
FIG. 7 is a picture illustrating rendering of the exemplary page shown in FIG. 5 according to exemplary embodiments of the present invention wherein graphic-list partitioning may be based on runs of graphical objects of the same graphical-object type.
Figure 7:
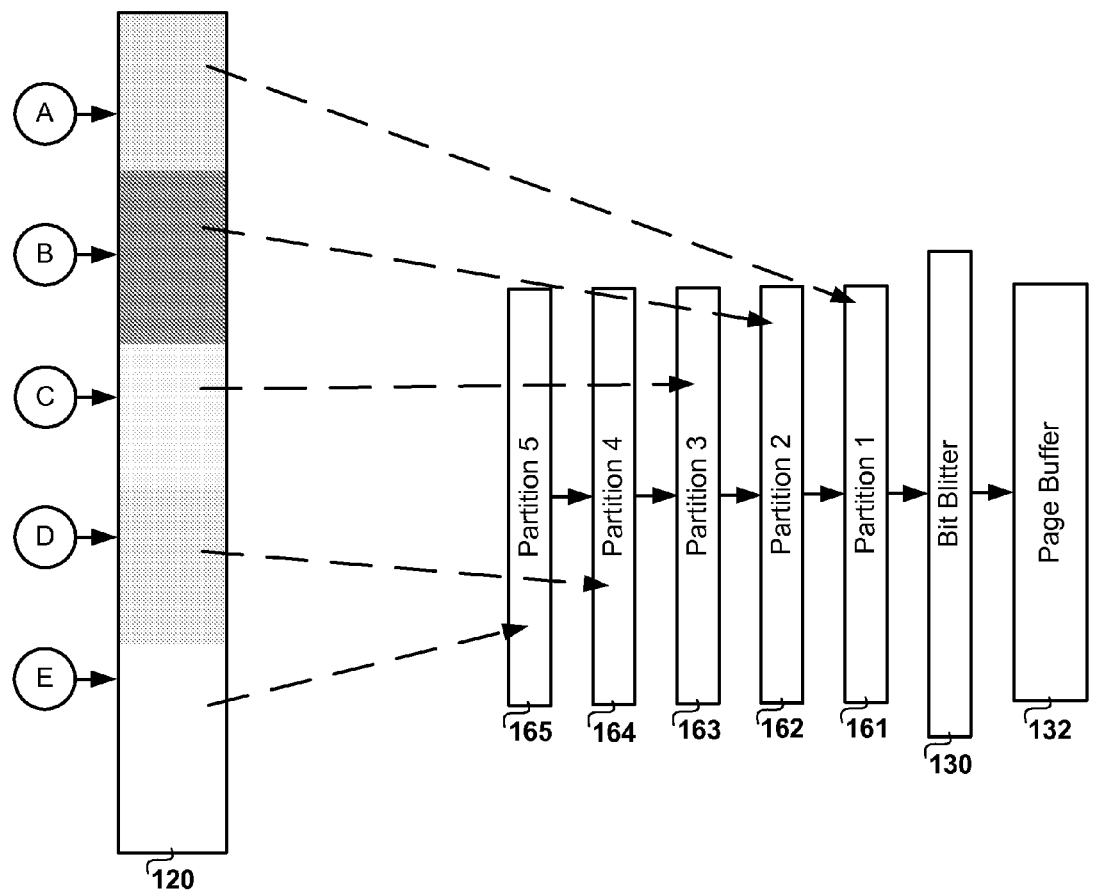

FIG. 6 and FIG. 7 illustrate an exemplary rendering 24 and bit-blitting 26, according to some embodiments of the present invention, for the exemplary pages 60, 80 shown in FIG. 4 and FIG. 5, respectively.

In relation to FIG. 4 and FIG. 6, a partition generator 100 may generate multiple partitions 101-107 from a graphic list associated with a page 60. The partitions 101-107 may be illustrated pictorially in FIG. 6 by a picture of the associated graphical object. Each partition 101-107 may be rendered on a specialized renderer 111-117 appropriate to the graphical-object type associated with the respective partition 101-107. Partition rendering may be performed at any level of concurrency based on processor availability or other factors. The partitions 101-107 may be rendered into a rendered buffer 120 or other memory. Based on the partition placement order, rendered partitions 121-127 may be bit-blit 130 to a page buffer 132 or other page memory. In some embodiments of the present invention, bit-blitting 130 may commence once all partitions have been rendered. In alternative embodiments, bit-blitting 130 of a partition may commence once the partition has been rendered and all partitions preceding the partition in the placement order have been bit-blitted.

In relation to FIG. 5 and FIG. 7, a partition generator 100 may generate multiple partitions 141-145 from a graphic list associated with a page 80. The partitions 141-145 may be illustrated pictorially in FIG. 7 by a picture of the associated graphical objects. Each partition 141-145 may be rendered on a specialized renderer 151-155 appropriate to the graphical-object type associated with the respective partition 141-145. Partition rendering may be performed at any level of concurrency based on processor availability or other factors. The partitions 141-145 may be rendered into a rendered buffer 120 or other memory. Based on the partition placement order, rendered partitions 161-165 may be bit-blit 130 to a page buffer 132 or other page memory. In some embodiments of the present invention, bit-blitting 130 may commence once all partitions have been rendered. In alternative embodiments, bit-blitting 130 of a partition may commence once the partition has been rendered and all partitions preceding the partition in the placement order have been bit-blitted.

"By-object-run" partitioning may allow for concurrent or "out-of-order" rendering and sequential bit-blitting. Alternative embodiments of the present invention may comprise concurrent or "out-of-order" rendering and concurrent or "out-of-order" bit-blitting. In some of these embodiments, a graphic list may be partitioned into two partitions: a first partition, which may be referred to as the "overlap" partition, that contains any graphic-list element that, when rendered, overlaps, or is overlapped by, another graphic-list element; and a second partition, which may be referred to as the "non-overlap" partition, that contains graphic-list elements that, when rendered, do not overlap, and are not overlapped by, other graphic-list elements. The term overlap may be used to indicate both an overlapped object and an overlapping object.

Figure 8:
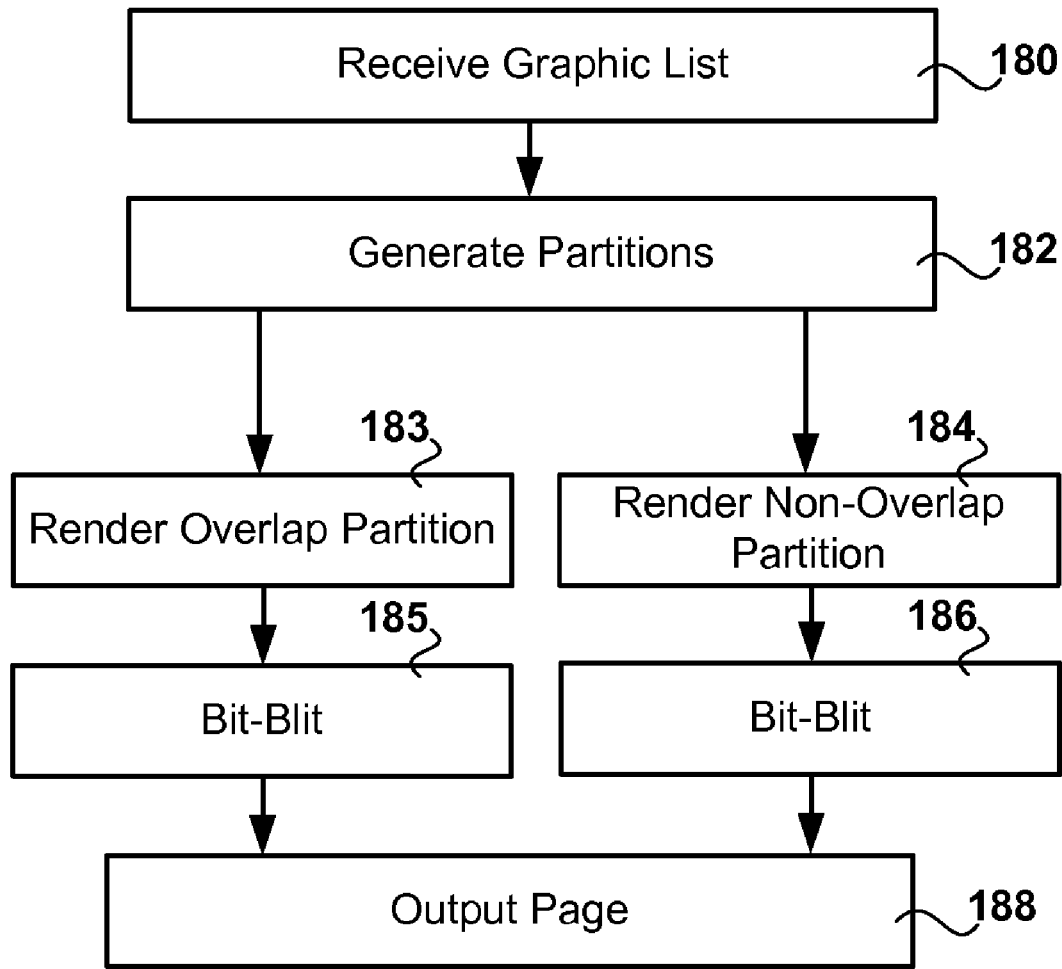
FIG. 8 is a chart showing exemplary embodiments of the present invention comprising graphic-list partitioning based on an overlap status of graphical objects.

Some of these embodiments may be described in relation to FIG. 8. A graphic list may be received 180, and two partitions may be generated 182. An "overlap" partition may contain any graphic-list element that, when rendered, overlaps, or is overlapped by, another graphic-list element. A "non-overlap" partition may contain graphic-list elements that, when rendered, do not overlap, and are not overlapped by, other graphic-list elements. Each partition may be rendered 183, 184 by a general renderer. The rendering 183, 184 may be concurrent based on renderer availability or other factors. The rendered data may be bit-blit 185, 186, and the page may be output 188 to the print engine for printing. A rendered partition may be bit-blit independently of the processing of the other partition. These embodiments of the present invention may be referred to as "by-overlap-partitioning" embodiments. In some "by-overlap-partitioning" embodiments, a partition may comprise the following information: a partition type, for example, "overlap" or "non-overlap," optionally a processor type or processor number, a list of functions which may be performed on the partition, and a partition body comprising the graphic-list elements associated with the partition.

Figure 9:
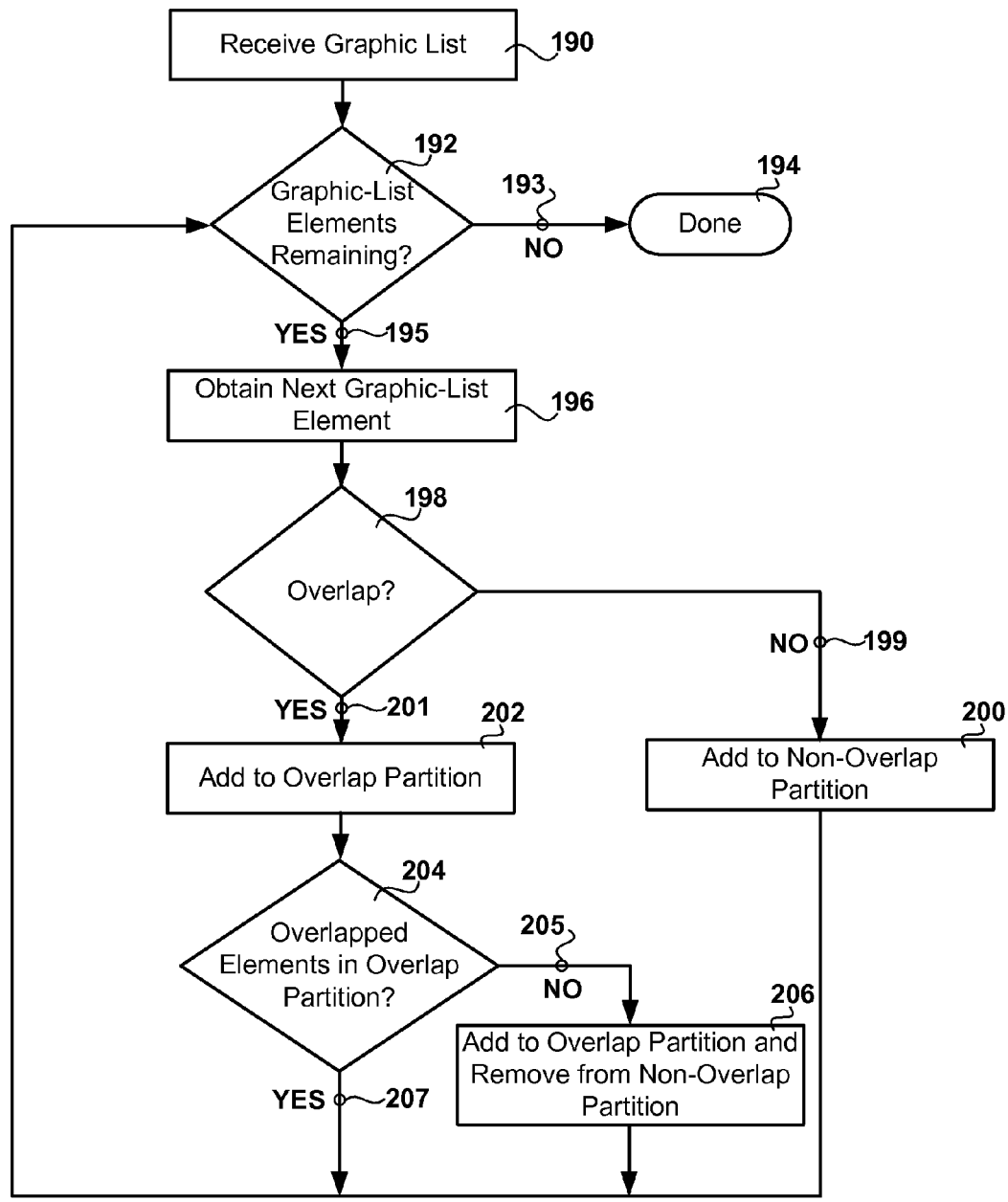
FIG. 9 is a chart showing exemplary embodiments of the present invention comprising graphic-list partitioning based on an overlap status of graphical objects.

Some embodiments of the present invention comprising "by-overlap" partitioning may be described in relation to FIG. 9. A graphic list may be received 190, and it may be determined 192 if graphic-list elements remain which have not been assigned to a partition. If there are no 193 unassigned graphic-list elements, then the partitioning may terminate 194. If there are 195 unassigned graphic-list elements, then the next graphic-list element may be obtained 196. The recently obtained, next graphic-list element may be compared 198 against previously examined graphic-list elements to determine if the recently obtained, next graphic-list element overlaps at least one previously examined graphic-list element. If there is no overlap 199, then the recently obtained, next graphic-list element may be added 200 to the "non-overlap" partition. If the recently obtained, next graphic-list element overlaps 201 at least one previously examined graphic-list element, then the recently obtained, next graphic-list element may be added 202 to the "overlap" partition. The overlapped graphic-elements may be moved 206 from the "non-overlap" partition to the "overlap" partition, if they were previously placed in the "non-overlap" partition 205, and the graphic list may be checked 192 for unassigned graphic-list elements. If an overlapped graphic-list element was previously placed in the "overlap" partition 207, then the graphic list may be checked 192 for unassigned graphic-list elements.

"By-overlap" partitioning may be further illustrated in relation to the exemplary page 60 shown in FIG. 4. The "overlap" partition may contain the graphic-list elements:

1. DrawText (Text1, Text2, Text3, Text4, Text5) 62
2. DrawRectangle (red) 64
4. DrawEllipse (blue) 68
6. DrawRectangle (green) 72
7. DrawPatch (pictorial_image_2) 74, and the "non-overlap" partition may contain the graphic-list elements:

3. DrawText (Text6, Text7) 66
5. DrawPatch (pictorial_image_1) 70.

Figure 10:
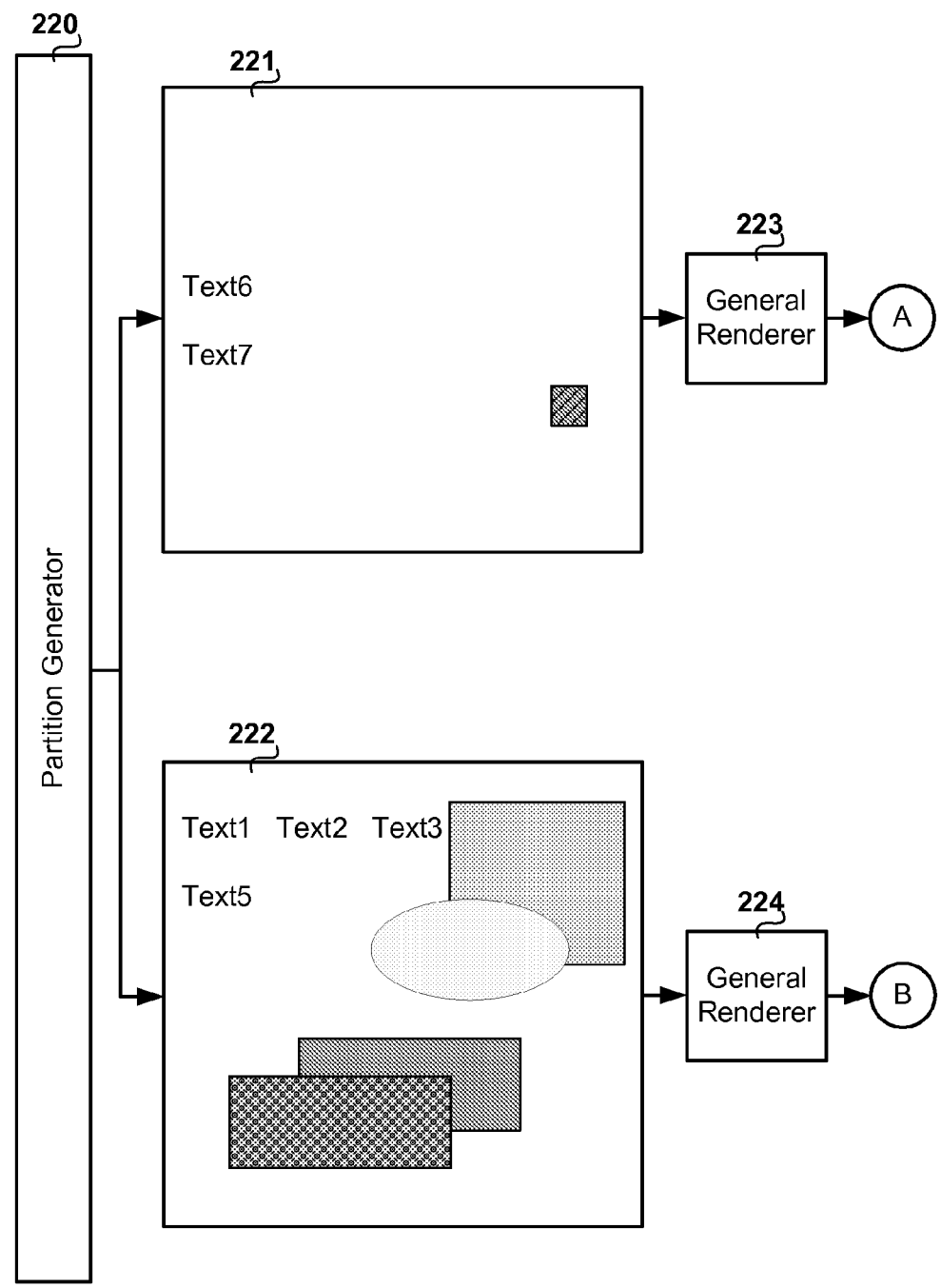
FIG. 10 is a picture illustrating rendering of the exemplary page shown in FIG. 4 according to exemplary embodiments of the present invention wherein graphic-list partitioning may be based on an overlap status of graphical objects.
Figure 10:
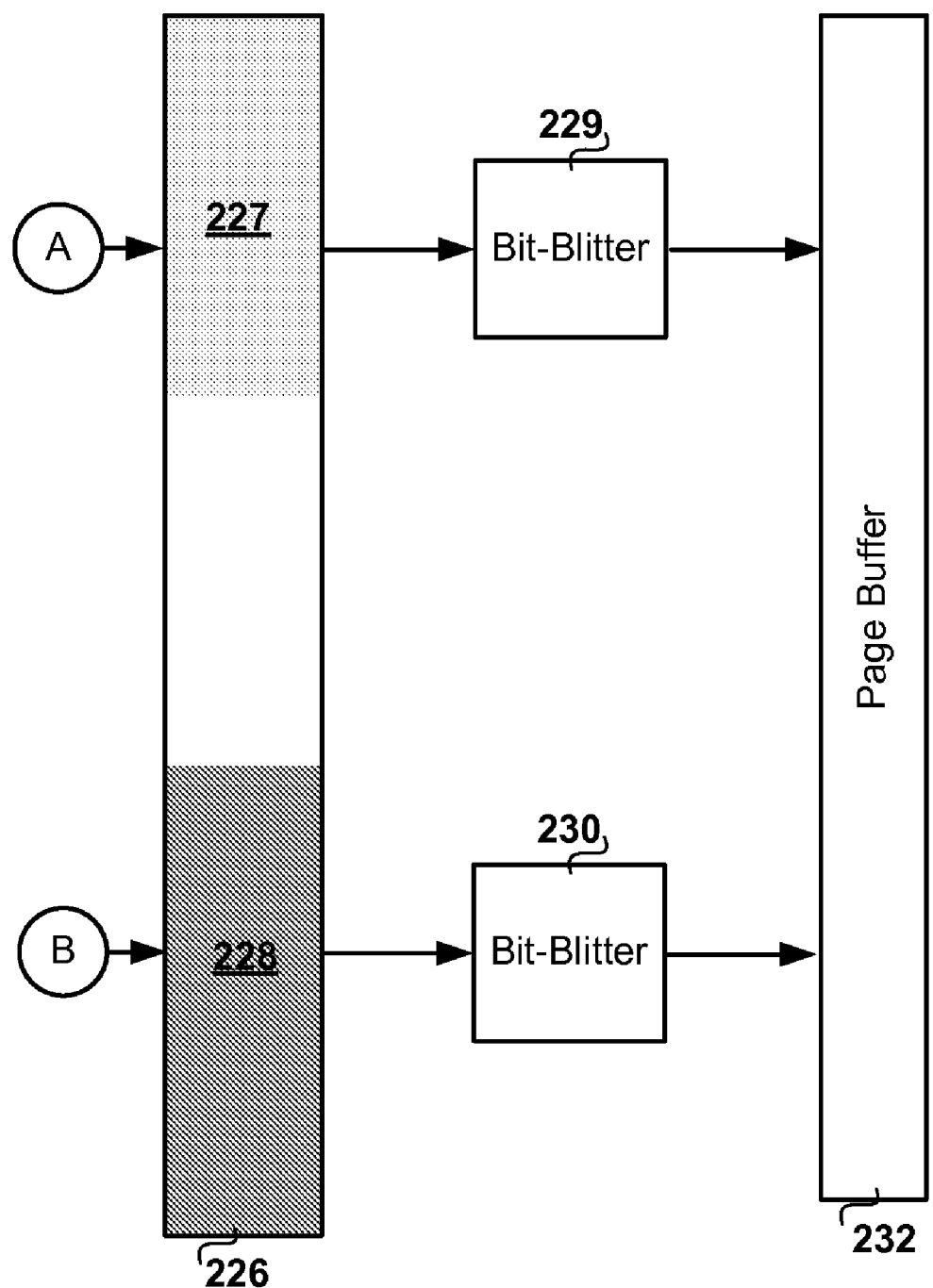

FIG. 10 illustrates exemplary processing of the exemplary page 60 according to embodiments of the present invention comprising "by-overlap" partitioning. In this example, two partitions, a "non-overlap" partition 221 and an "overlap" partition 222, may be generated by the partition generator 220. Each partition 221, 222 may be rendered by a general renderer 223, 224 to a rendered buffer 226 or other memory. The rendering may be concurrent based on renderer availability or other factors. A rendered partition 227, 228 may be bit-blit 229, 230 to a page buffer 232 or other memory. The bit-blit 229, 230 may be concurrent between the rendered "overlap" partition 228 and the rendered "non-overlap" partition 227. The bit-blit 230 within the "overlap" partition 222 may still be sequential.

In some embodiments of the present invention, overlapping, non-translucent graphical objects of the same color may be placed in the "non-overlap" partition since the order in which they are rendered relative to each other does not matter. However, if a first of the same-color graphical objects also overlaps another different-color graphical object, with which it may not be considered non-overlapping, then the first of the same-color graphical objects and the different-color graphical object may be placed in the "overlap" partition. The other of the same-color graphical objects may remain in the "non-overlap" partition if this graphical object does not overlap any other different-color graphical object.

Figure 11:
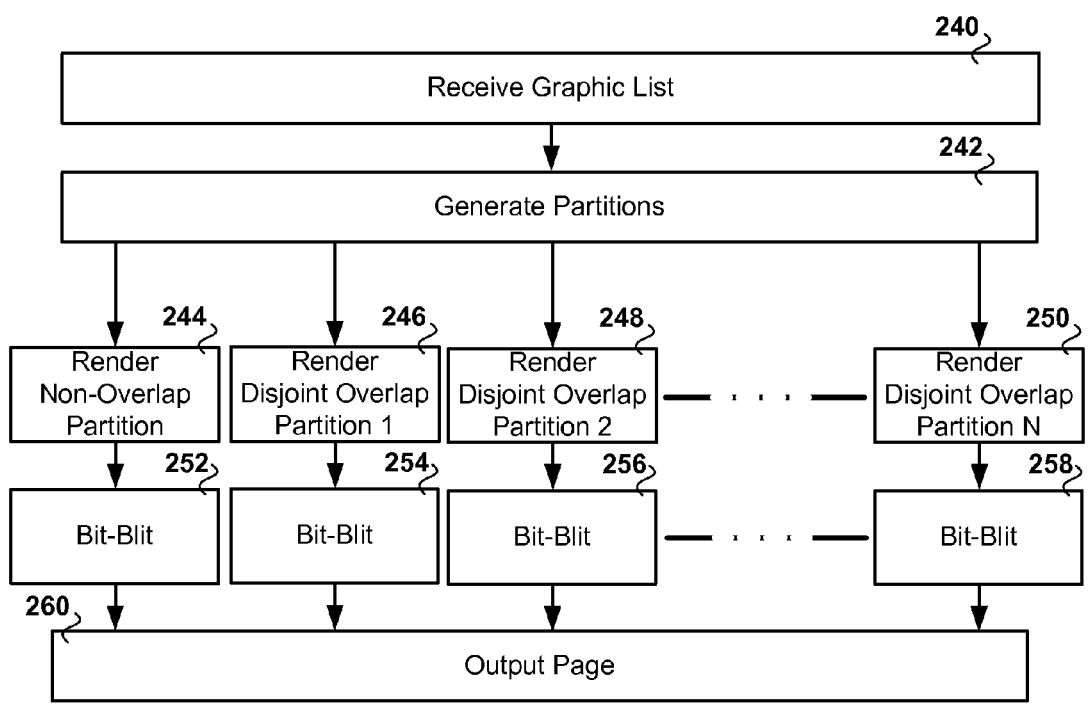
FIG. 11 is a chart showing exemplary embodiments of the present invention comprising graphic-list partitioning based on separation of graphic-list elements into disjoint groups of overlapping graphical objects.

In alternative embodiments, an "overlap" partition may be further partitioned into sub-partitions, wherein each sub-partition is spatially disjoint. These embodiments may be referred to as "by-disjoint-overlap-partitioning" embodiments. In some of these alternative embodiments described in relation to FIG. 11, a graphic list may be received 240, and partitions may be generated 242 from the graphic list. The partitions may comprise a first partition associated with all graphic-list elements that do not overlap, and are not overlapped by, any other graphic-list element. This partition may be referred to as the "non-overlap" partition. A plurality of partitions associated with overlapping graphic-list elements may be generated. These partitions may be referred to as the "overlap" partitions. Each "overlap" partition may contain overlapping graphic-list elements, wherein the "overlap" partitions comprise disjoint groups of overlapping graphic-list elements. The "non-overlap" partition and the disjoint "overlap" partitions may be rendered 244, 246, 248, 250. Partition rendering 244, 246, 248, 250 may be concurrent or "out-of-order" based on renderer availability and other factors. Rendering within a disjoint "overlap" partition may be sequential. The rendered partitions may be bit-blit 252, 254, 256, 258, and the rendered page may be output 260. Rendered-partition bit-blitting 252, 254, 256, 258 may be concurrent or "out-of-order" since the associated partitions do not overlap spatially. Bit-blitting within a rendered disjoint "overlap" partition may be sequential.

Figure 12:
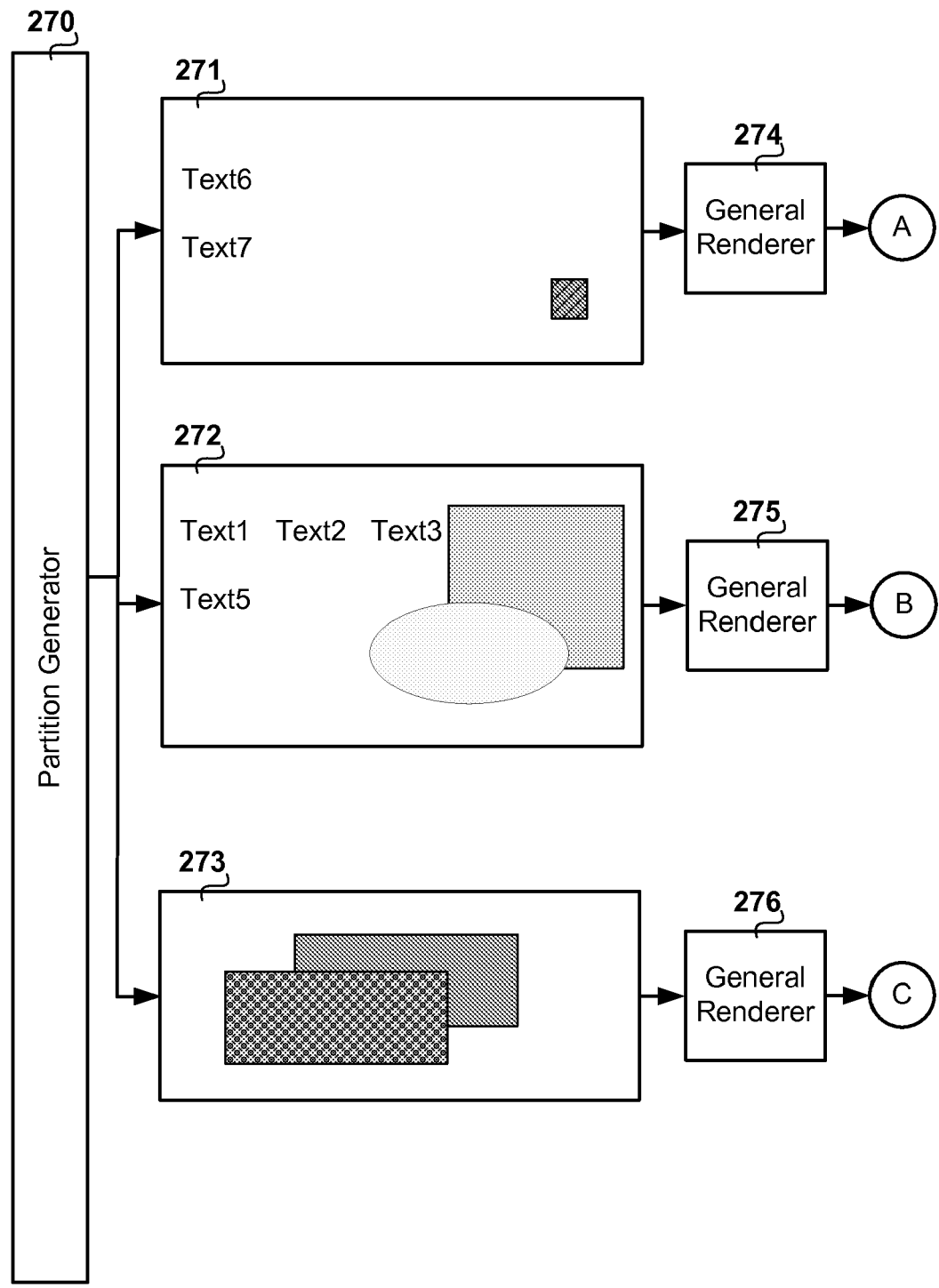
FIG. 12 is a picture illustrating rendering of the exemplary page shown in FIG. 4 according to exemplary embodiments of the present invention wherein graphic-list partitioning may be based on the separation of graphic-list elements into disjoint groups of overlapping graphical objects.
Figure 12:
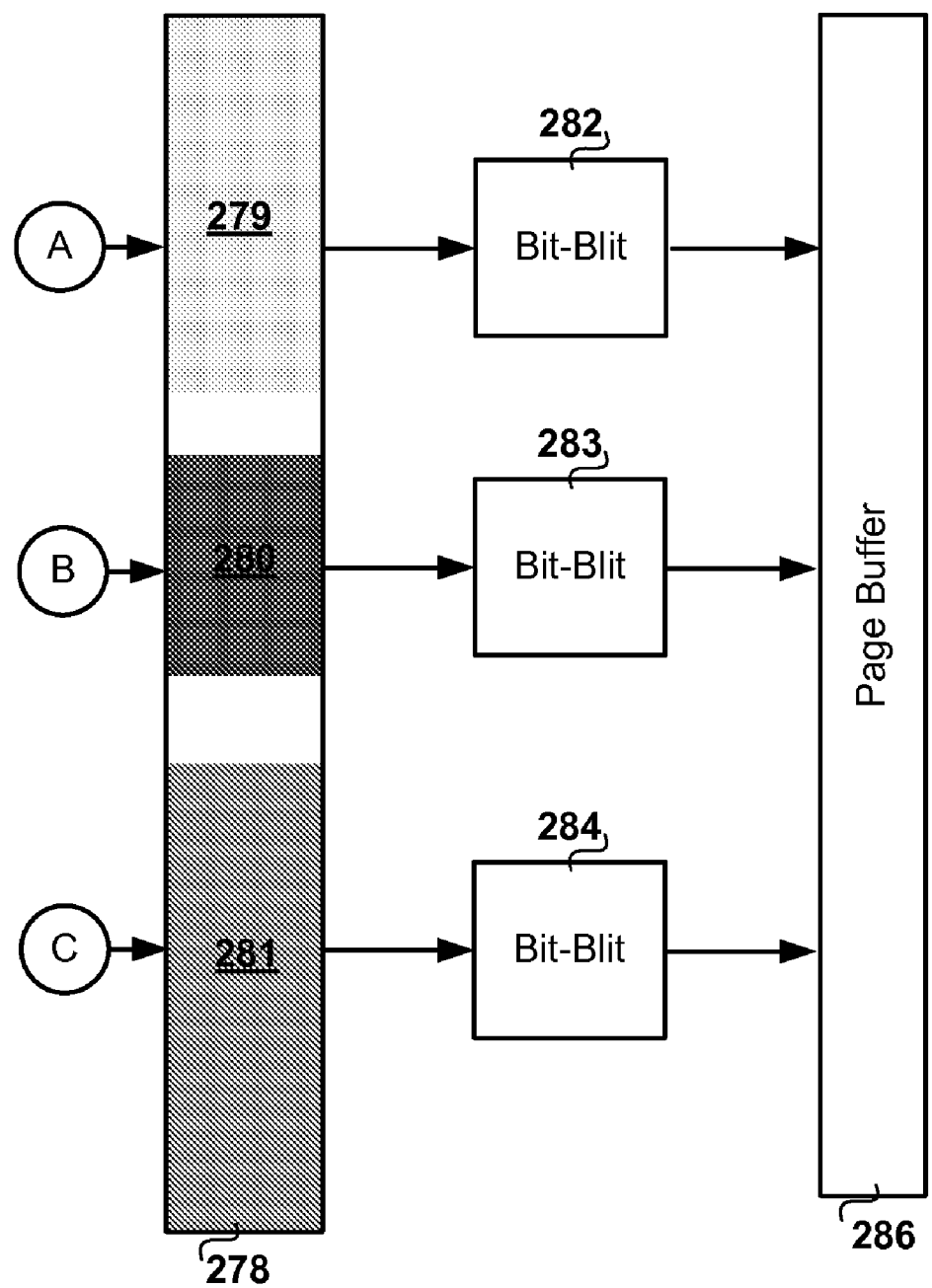

FIG. 12 illustrates exemplary processing of the exemplary page 60 in FIG. 4 according to embodiments of the present invention comprising "by-disjoint-overlap" partitioning. In this example, three partitions, a "non-overlap" partition 271 and two disjoint "overlap" partitions 272, 273, may be generated by the partition generator 270. Each partition 271, 272, 273 may be rendered by a general renderer 274, 275, 276 to a rendered buffer 278 or other memory. The partition rendering may be concurrent or "out-of-order" based on renderer availability or other factors. A rendered partition 279, 280, 281 may be bit-blit 282, 283, 284 to a page buffer 286 or other memory. The page bit-blitting 282, 283, 284 may be concurrent or "out-of-order."

Figure 13:
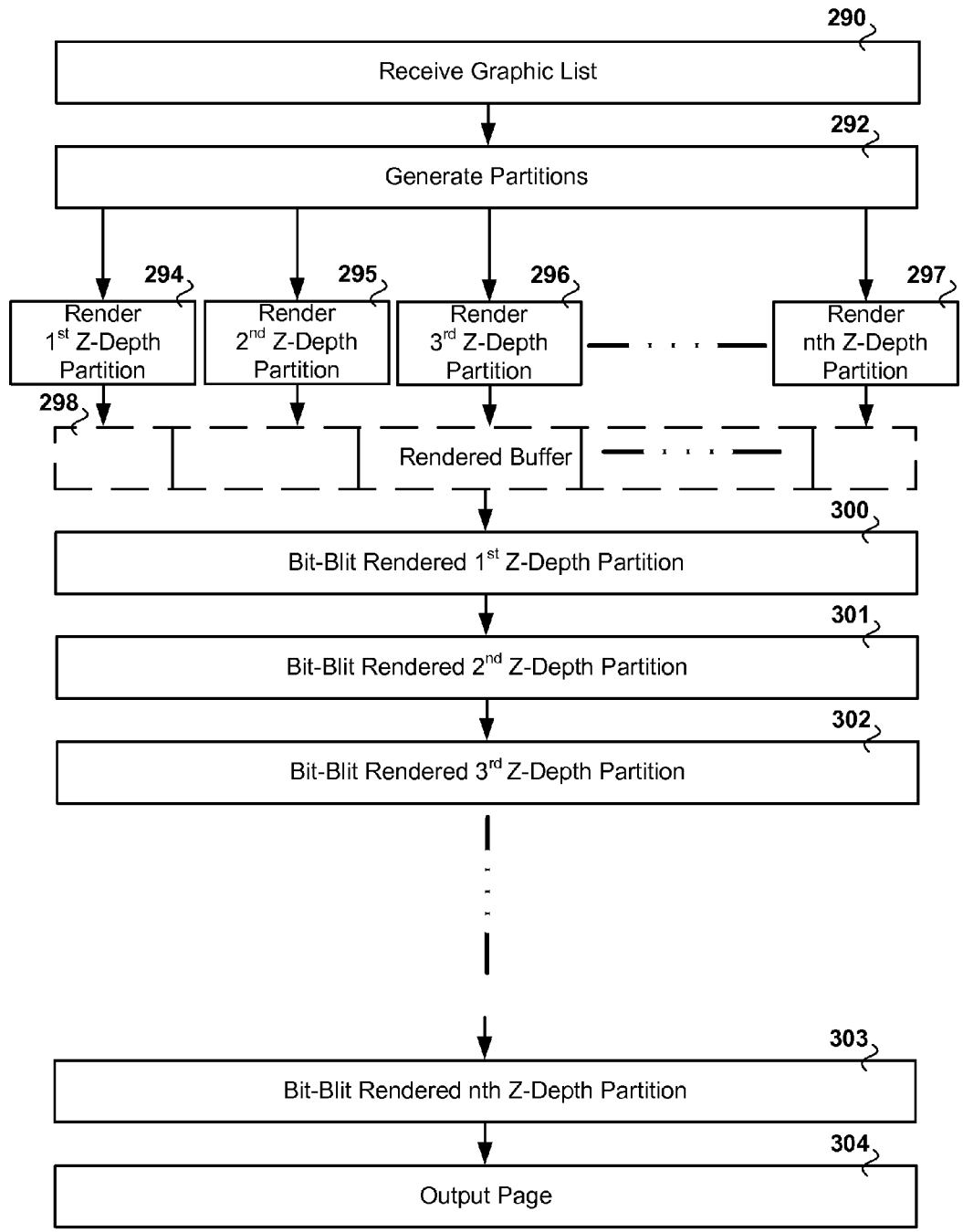
FIG. 13 is a chart showing exemplary embodiments of the present invention comprising graphic-list partitioning based on z-depth.

Alternative embodiments of the present invention described in relation to FIG. 13 may comprise partitioning a graphic list based on graphical-object z-depth. These embodiments may be referred to as "by-z-depth-partitioning" embodiments. A graphic list may be received 290, and partitions may be generated 292 based on the z-depth of graphic-list elements. In some embodiments, the graphic-list elements in a partition may have the same z-depth. In alternative embodiments, a range of consecutive z-depth values may be associated with a partition, and a partition may comprise the graphic-list elements with z-depth values in the associated range. In yet alternative embodiments, two, or more, non-consecutive z-depth values may be associate with a partition. Each partition may be rendered 294, 295, 296, 297 to a rendered buffer 298 or other memory, and the rendered partitions may be bit-blit sequentially 300, 301, 302, 303 in order of z-depth, or z-depth range. Thus in some embodiments, the rendered partition associated with graphical objects with a z-depth of zero may be bit-blit 300 first. The rendered partition associated with graphical objects with a z-depth of one may be bit-blit 301 second, and so on until all rendered partitions have been bit-blit. In alternative embodiments, sequential bit-blitting may comprise intermediate concurrently performed bit-blitting (not shown). The rendered page may be output 304.

Figure 14:
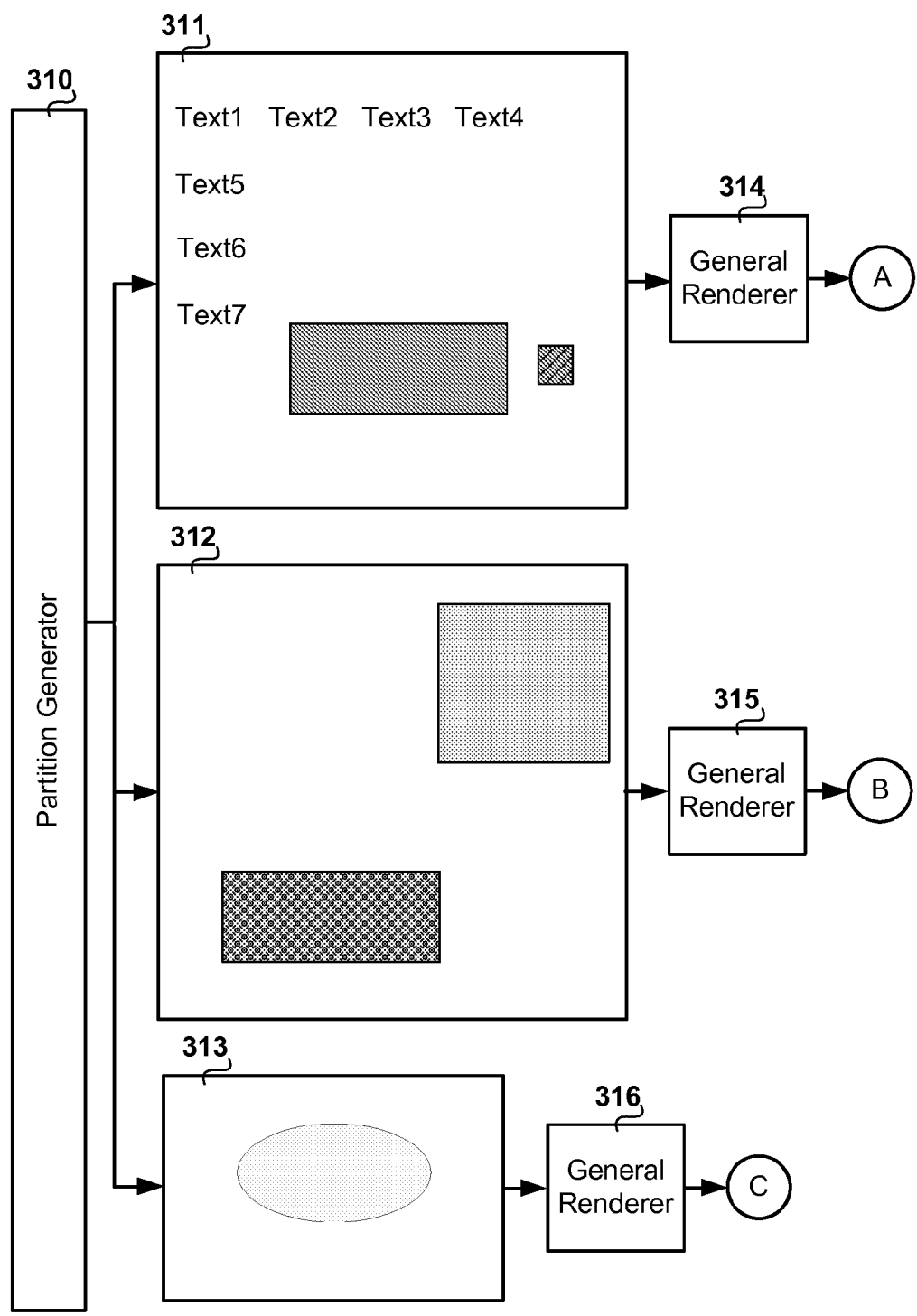
FIG. 14 is a picture illustrating rendering of the exemplary page shown in FIG. 4 according to exemplary embodiments of the present invention wherein graphic-list partitioning may be based on z-depth.
Figure 14:
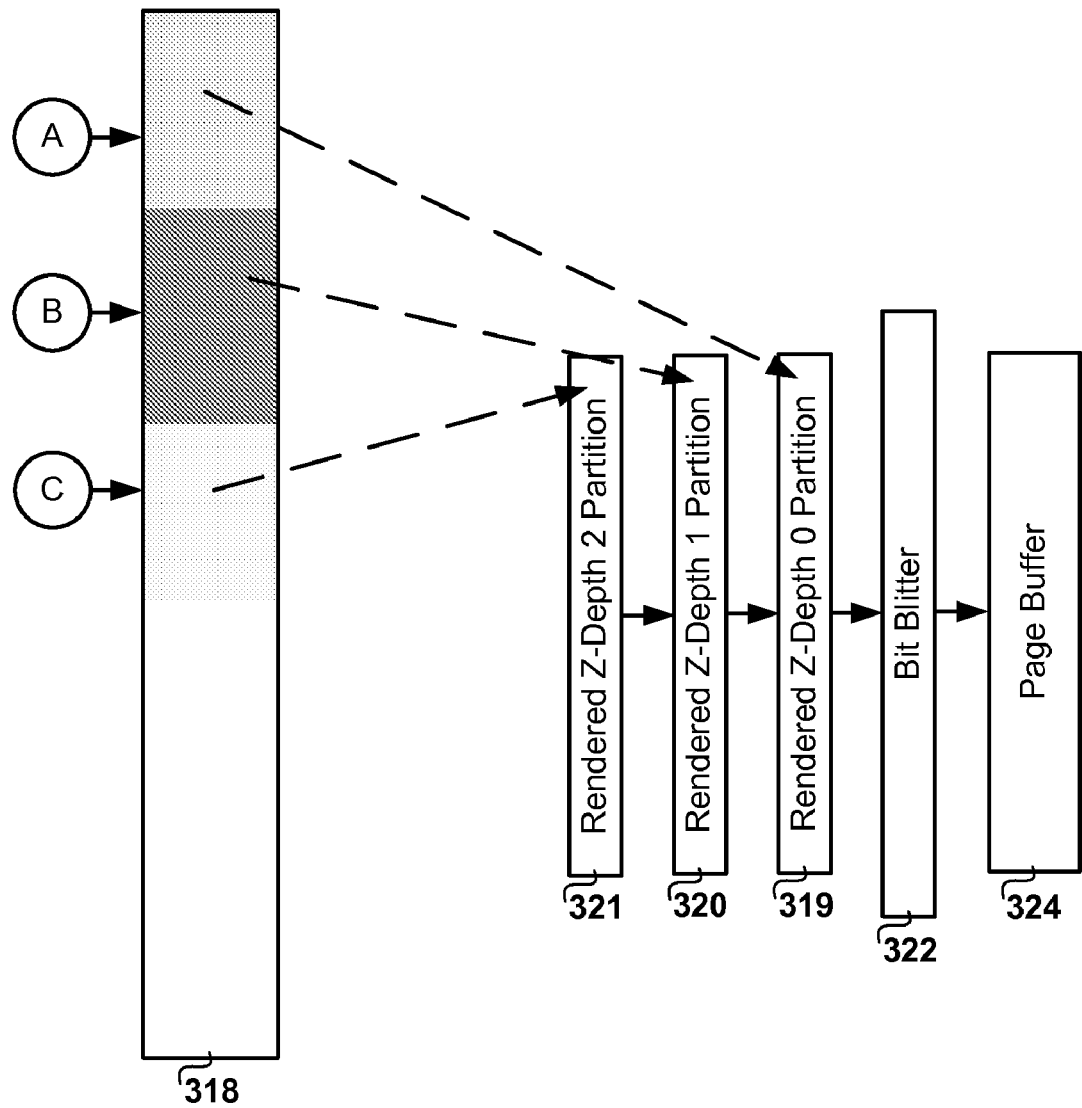

FIG. 14 illustrates exemplary processing of the exemplary page 60 in FIG. 4 according to embodiments of the present invention comprising "by-z-depth" partitioning. In this example, a partition generator 310 may generate three partitions 311, 312, 313 associated with z-depths of 0, 1 and 2, respectively. Each partition 311, 312, 313 may be rendered 314, 315, 316 by a general renderer to a rendered buffer 318 or other memory. Partition rendering 314, 315, 316 may be concurrent or "out-of-order" based on renderer availability or other factors. The rendered partitions 319, 320, 321 may be bit-blit 322 sequentially by z-order to a page buffer 324 or other memory.

Figure 15A:
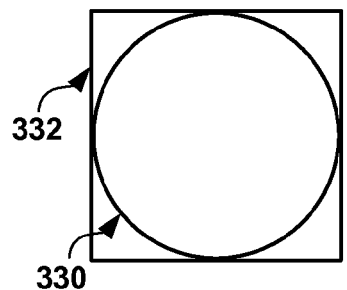
FIG. 15A is a picture of an exemplary bounding box associated with an exemplary graphical object.
Figure 15B:
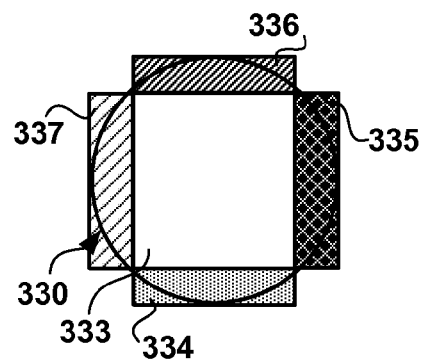
FIG. 15B is a picture of exemplary additive bounding shapes associated with an exemplary graphical object.
Figure 15C:
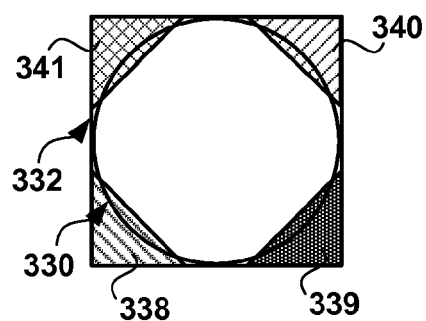
FIG. 15C is a picture of exemplary subtractive bounding shapes associated with an exemplary graphical object.

In some embodiments of the present invention, graphic-list partitioning (for example, "by-overlap" partitioning, "by-disjoint-overlap" partitioning and "by-z-depth" partitioning) may require determination of the overlap status of two, or more, graphic-list elements. In some embodiments of the present invention, a graphic-list element may be associated with a bounding box or a bounding shape. The bounding box, or bounding shape, may demarcate a spatial region on a rendered page corresponding to the rendered graphic-list element. In some embodiments of the present invention, multiple bounding shapes may be associated with a graphic-list element. FIG. 15A depicts an exemplary bounding box 332 associated with a circle 330. FIG. 15B depicts a circle 330 and an exemplary group of multiple, associated bounding shapes 333-337. In this example, the rendered circle 330 may be associated with the sum of the rendered regions associated with the multiple, associated bounding shapes 333-337. FIG. 15C depicts a circle 330 and an exemplary group of multiple, associated bounding shapes 332, 338-341. In this example, the rendered circle 330 may be associated with the bounding shapes 332, 338-341 in a subtractive association. An approximation to the spatial region occupied by the rendered circle 330 may be the region occupied by the square 332, removing the triangular regions 338-341.

In some embodiments of the present invention, two graphic-list elements may be considered overlapping if the bounding-shape approximations of the respective graphic-list elements overlap. Some embodiments of the present invention may comprise direct comparison of the associated bounding shapes. In these embodiments, the bounding shapes may be parsed and compared to determine overlap status.

Figure 16:
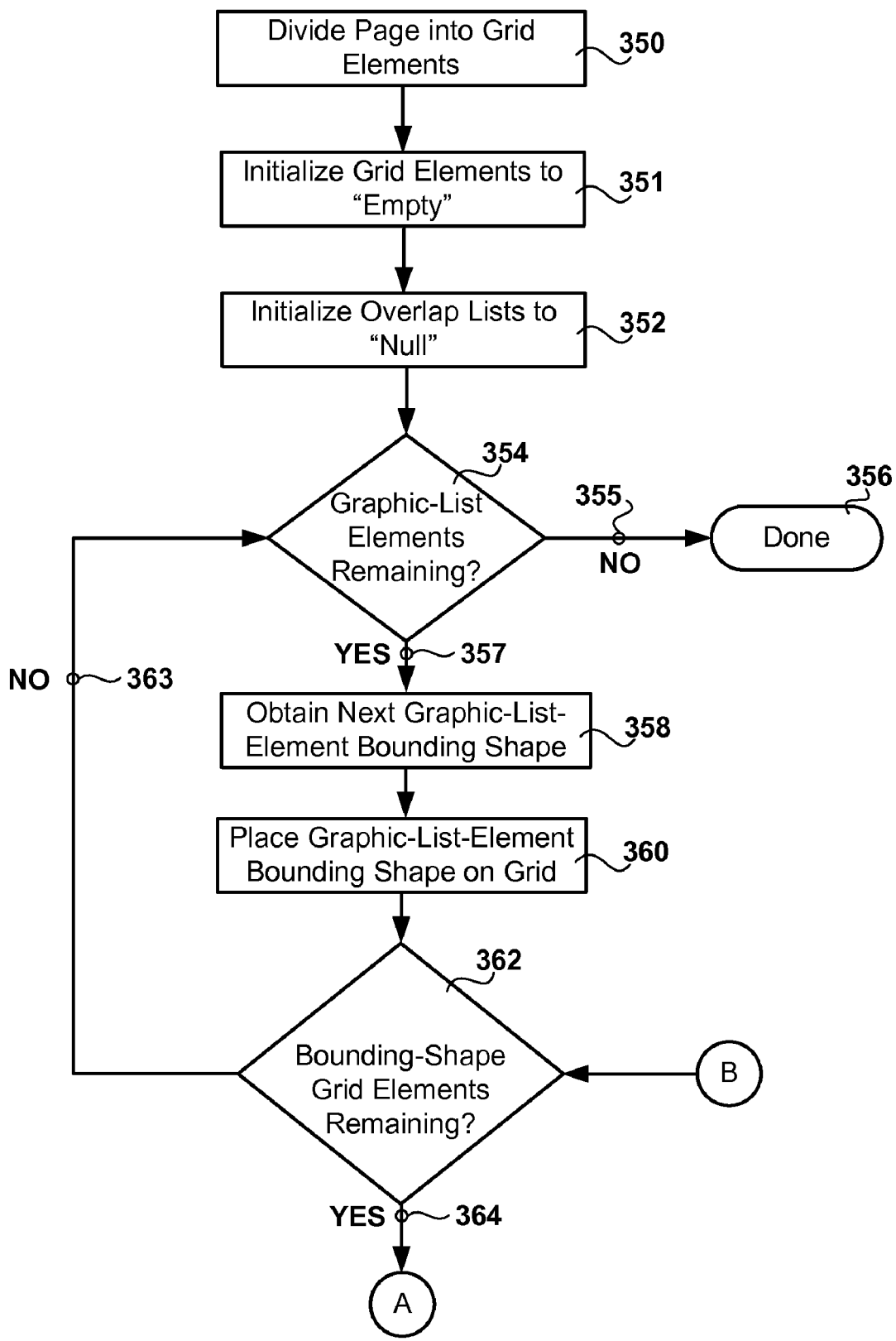
FIG. 16 is a chart showing exemplary embodiments of the present invention comprising determining overlap status of graphical objects using a grid page.
Figure 16:
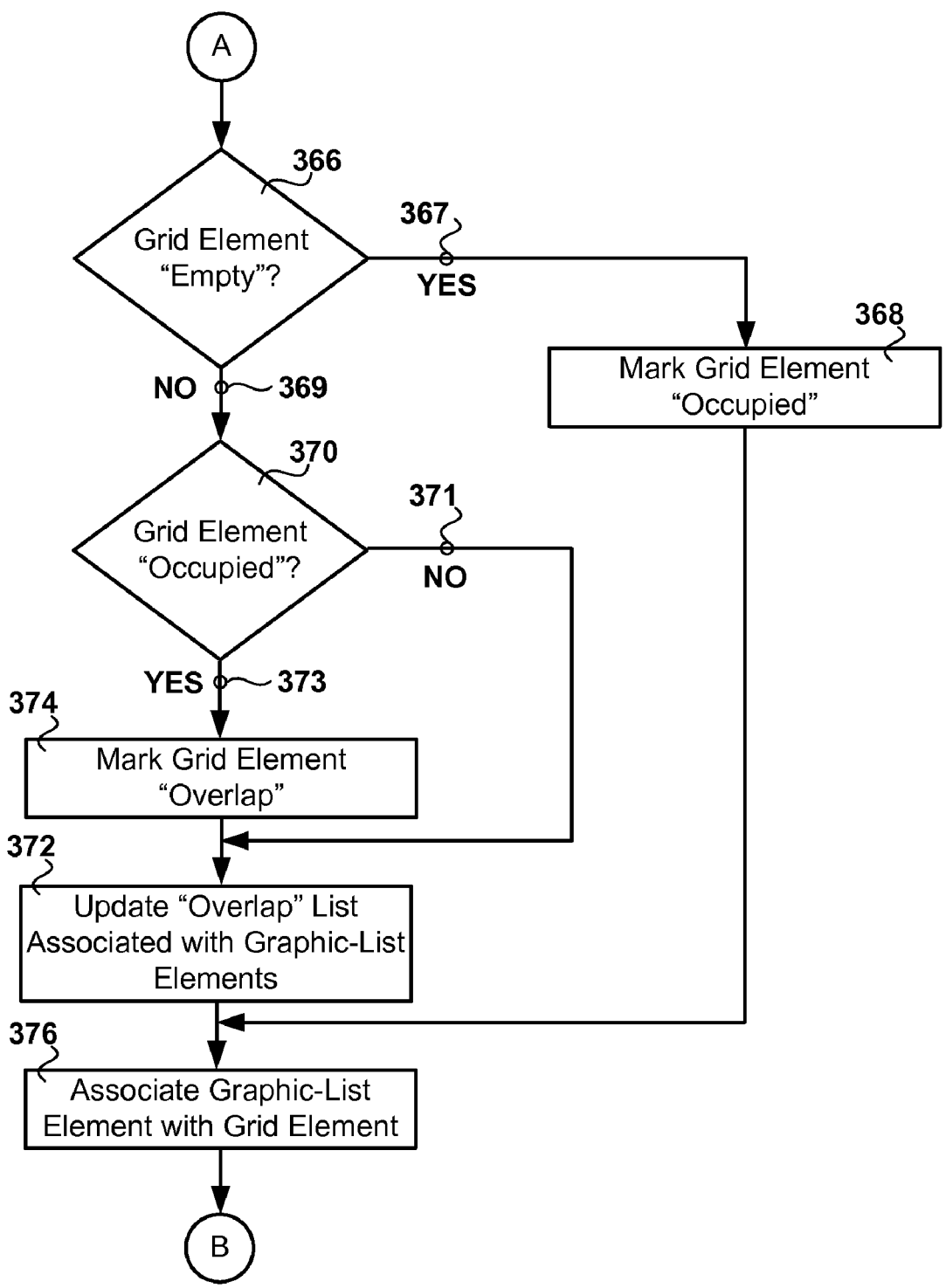

Alternative embodiments may comprise using a page grid to determine graphic-list element overlap. Alternative embodiments of the present invention described in relation to FIG. 16 may comprise dividing 350 a page into grid elements, initializing 351 each grid element to an "empty" state that indicates no graphical objects occupy the spatial region associated with the grid element and using the grid to detect overlapping graphical elements. An overlap list associated with each graphic-list element may be initialized 352 to "null" indicating that the graphic-list element does not overlap, and is not overlapped by, another graphic-list element. Each graphic-list element may be examined. The graphic list may be examined to determine 354 if there are remaining unexamined graphic-list elements. If all graphic-list elements have been examined 355, then the overlap-determination process may terminate 356. If unexamined graphic-list elements remain 357, then the bounding shape associated with the next graphic-list element may be obtained 358 and placed 360 on the grid. Each grid element that overlaps the bounding shape may be examined 362. If there are no remaining overlapping grid elements 363 to examine, then the graphic-list may be examined 354 for unexamined graphic-list elements. If there are remaining overlapping grid elements 364 to examine, then if the current grid element is 367 associated with the "empty" state, then the grid-element association may be changed 368 from "empty" to "occupied", and the graphic-list element may be associated 376 with the grid element. If the grid element is not 369 associated with the "empty" state, then the grid-element association may be examined 370 to determine if the grid element is associated with the "occupied" state. If the grid element is not 371 associated with the "occupied" state, then the grid element is already overlapped by two or more graphic-list elements. The overlap list associated with each of the graphic-list elements that overlap the grid element may be updated 372 to indicate that the currently examined graphic-list element overlaps these graphic-list elements, and the currently examined graphic-list element may be associated with the grid element. If the grid element is 373 associated with the "occupied" state, then the grid-element association may be changed 374 to an "overlap" state indicating that two graphic-list elements overlap in the grid element. The overlap list associated with the graphic-list elements may be updated 372, and the currently examined graphic-list element may be associated 376 with the grid element. After all grid elements are examined 363, then the graphic list may be examined 354 for remaining graphic-list elements.

Figure 17:
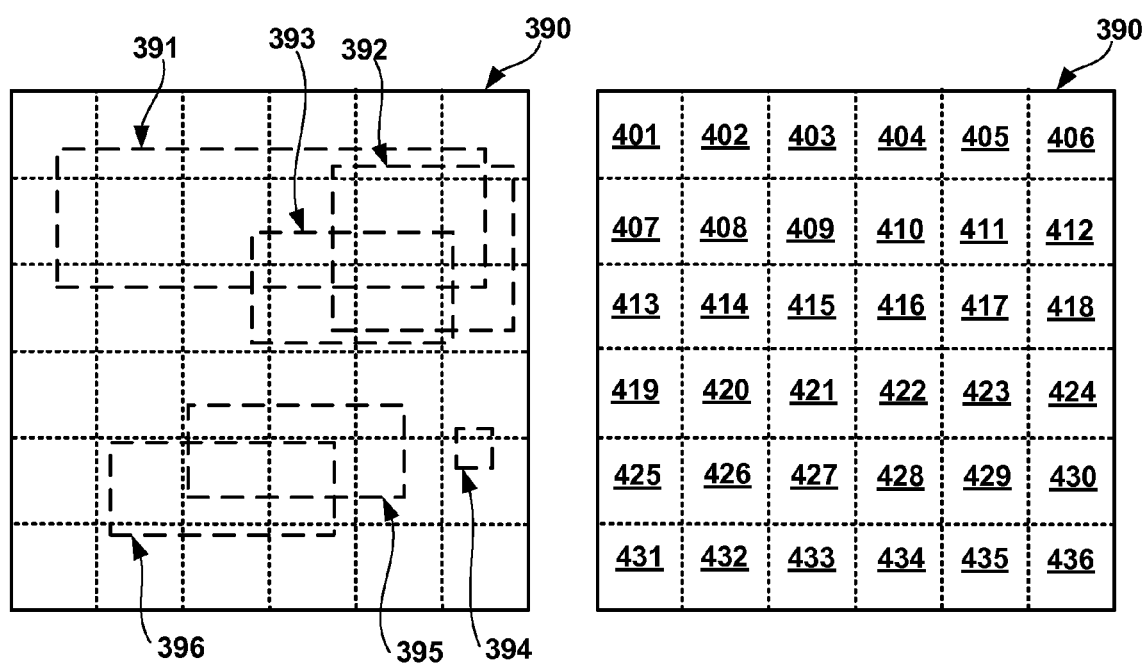
FIG. 17 is a picture illustrating exemplary bounding boxes and grid elements.

These embodiments of the present invention may be understood in relation to an exemplary page grid 390 shown in FIG. 17 which depicts exemplary bounding boxes 391-396 for six graphical objects, which may be denoted object1 through object6, respectively. The page grid 390 comprising six-by-six grid elements 401-436 is shown, for clarity, with the grid elements labeled in a separate depiction from the page grid depicting the bounding boxes 391-396. Initially, all grid elements 401-436 may be labeled with a label associated with the "empty" state. Table 3 shows the state of each grid element 401-436 after the examination of each graphic-list element. The grid elements examined when a graphic-list element is added are high-lighted in gray in the table. Table 4 shows the objects associated with each grid element 401-436 after the examination of each graphic-list element. The grid elements examined when a graphic-list element is added are high-lighted in gray in the table. Table 5 shows the overlap list associated with each graphic-list element after the examination of each graphic-list element.

A first graphic-list-element bounding shape 391 associated with object1 may be placed on the page grid 390. The grid elements 401-418 on which the first bounding shape 391 is placed may be examined. The labels for these grid elements 401-418 may be changed from "empty" to "occupied," and object1 may be associated with these grid elements 401-418.

A second graphic-list-element bounding shape 392 associated with object2 may be placed on the page grid 390. The grid elements 404-406, 410-412, 416-418 on which the second bounding shape 392 is placed may be examined. The labels for these grid elements 404-406, 410-412, 416-418 may be updated from "occupied" to "overlap," and object2 may be associated with these grid elements 404-406, 410-412, 416-418. Additionally, the overlap lists for object1 and object2 may be updated to reflect that these objects overlap.

A third graphic-list-element bounding shape 393 associated with object3 may be placed on the page grid 390. The grid elements 409-412, 415-418 on which the third bounding shape 393 is placed may be examined. The labels for the grid elements previously marked "occupied" 409, 415 may be changed to "overlap," and object3 may be associated with the grid elements on which the bounding shape 393 overlaps 409-412, 415-418. Additionally, the overlap lists for object1, object2 and object3 may be updated to reflect that these objects overlap.

A fourth graphic-list-element bounding shape 394 associated with object4 may be placed on the page grid 390. The grid elements 424, 430 on which the fourth bounding shape 394 is placed may be examined. The labels for the grid elements previously marked "empty" 424, 430 may be changed to "occupied," and object4 may be associated with these grid elements.

A fifth graphic-list-element bounding shape 395 associated with object5 may be placed on the page grid 390. The grid elements 421-423, 427-429 on which the fifth bounding shape 395 is placed may be examined. The labels for the grid elements previously marked "empty" 421-423, 427-429 may be changed to "occupied," and object5 may be associated with these grid elements.

A sixth graphic-list-element bounding shape 396 associated with object6 may be placed on the page grid 390. The grid elements 426-428, 432-434 on which the sixth bounding shape 396 is placed may be examined. The labels for the grid elements previously marked "occupied" 427, 428 may be changed to "overlap," and the grid elements previously marked "empty" 426, 432-434 may be changed to "occupied." Object6 may be associated with all of these grid elements 426-428, 432-434, and the overlap lists for objects and object6 may be updated to reflect that these objects overlap.

In alternative embodiments of the present invention, an overlap list may not be maintained at each object placement. Object overlap may be determined by parsing the object-grid-element associations after all of the objects have been placed.

In alternative embodiments of the present invention, successive refinement of overlap determination may be performed. In these embodiments, grid elements that contain multiple objects may be examined using an increasingly finer grid size. In an exemplary embodiment, an initial page grid may contain eight elements. At each iteration, any grid element that contains multiple objects may split into four grid elements for successive refinement of overlap determination. Some embodiments of the present invention may comprise a grid comprising single pixel grid elements. These embodiments may comprise rendering a binary mask associated with a graphic-list element.

Figure 18:
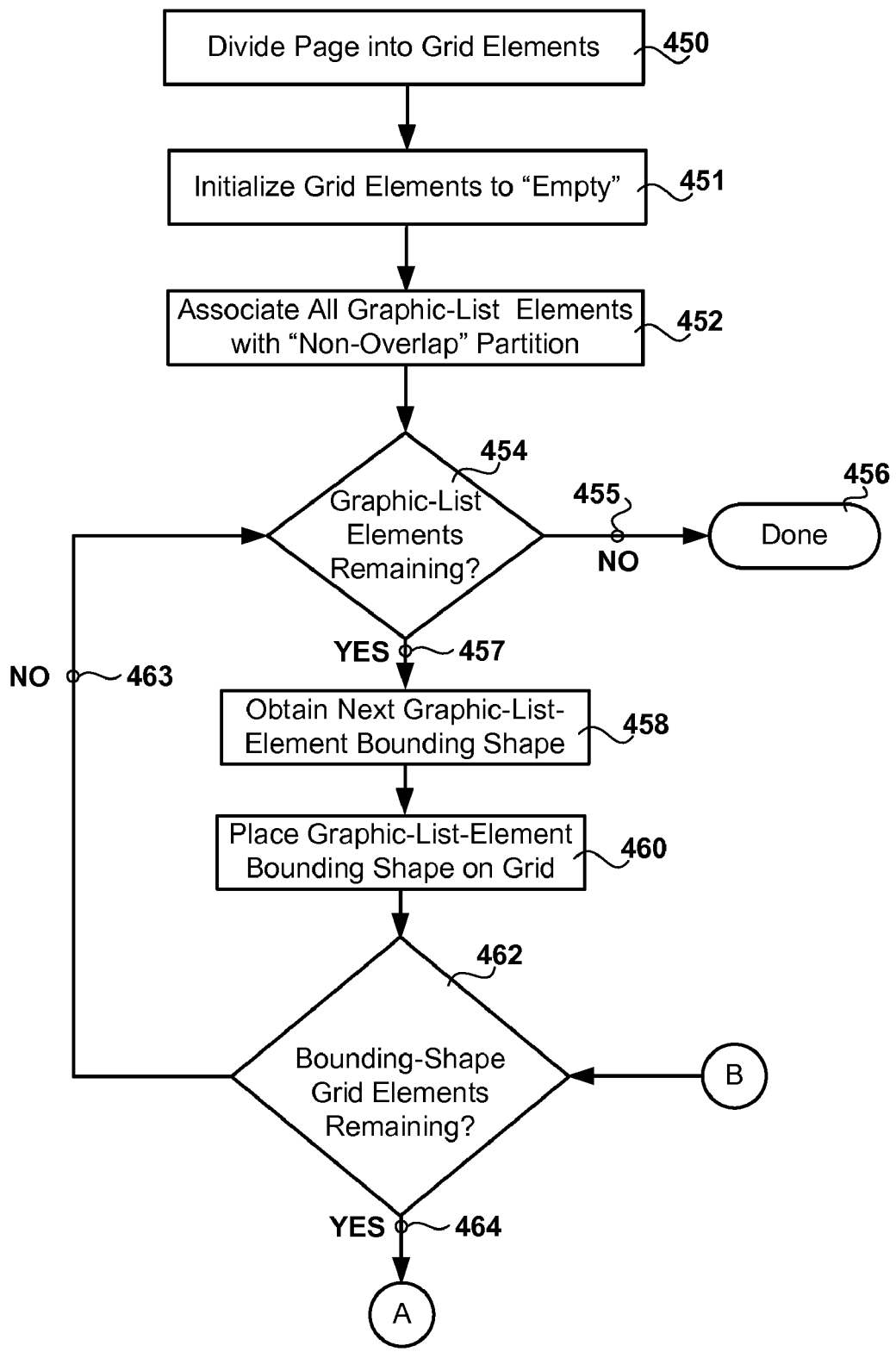
FIG. 18 is a chart showing exemplary embodiments of the present invention comprising using a grid page to determining an "overlap" partition and a "non-overlap" partition.
Figure 18:
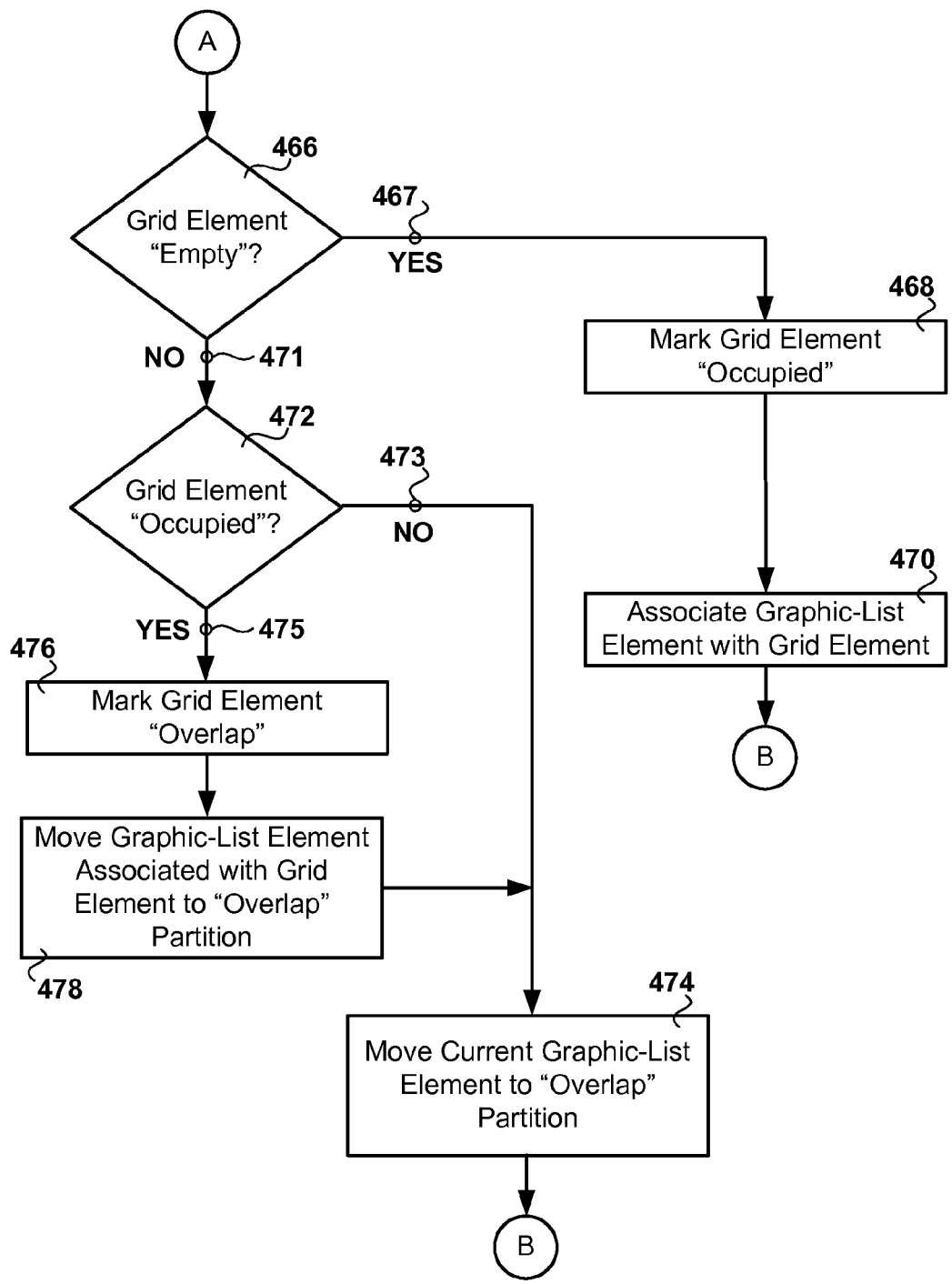

In some "by-overlap-partitioning" embodiments of the present invention described in relation to FIG. 18, a graphic-list element may be associated with the "overlap" partition when the grid element label is changed from "occupied" to "overlap" and when the bounding shape associated with the graphic-list element overlaps a grid element with an "overlap" label. In these embodiments, a page may be divided 450 into grid elements. The grid elements may be initially associated 451 with an "empty" label. The "non-overlap" partition may initially comprise 452 all of the graphic-list elements in the graphic list. The graphic list may be examined to determine 454 if there are remaining unexamined graphic-list elements. If all graphic-list elements have been examined 455, then the partitioning process may terminate 456. If there are 457 unexamined graphic-list elements, the next graphic-list-element bounding shape may be obtained 458 and placed 460 on the page grid. Each grid element that overlaps the bounding shape may be examined 462. If there are no remaining bounding-shape overlapping grid elements 463 to examine, then the graphic-list may be examined 454 for unexamined graphic-list elements. If there are remaining bounding-shape overlapping grid elements 464 to examine, then if the current bounding-shape grid element is 467 associated with the "empty" state, then the bounding-shape grid-element association may be changed 468 from "empty" to "occupied." The currently examined graphic-list element may be associated 470 with the currently examined grid element, and then remaining 462 bounding-shape grid elements may be examined. If the bounding-shape grid element is not 471 labeled "empty," then the label may be compared 472 to the label value associated with "occupied." If the bounding-shape grid element is not 473 "occupied," then the grid element must be already a grid element associated with overlapping objects, and the current graphic-list element may be associated 474 with the "overlap" partition. If the grid element is 475 marked "occupied," then the element label may be changed 476 to "overlap," and the graphic-list element associated with the grid element may be associated 478 with the "overlap" partition. The current graphic-list element may also be associated 474 with the "overlap" partition, and then remaining 462 grid elements may be examined.

In embodiments of the present invention comprising "by-disjoint-overlap" partitioning, grid elements comprising an "overlap" label may be parsed to detect disjoint groups of overlapping graphics objects. In some embodiments, grid-element parsing may comprise connected-component analysis.

Figure 19:
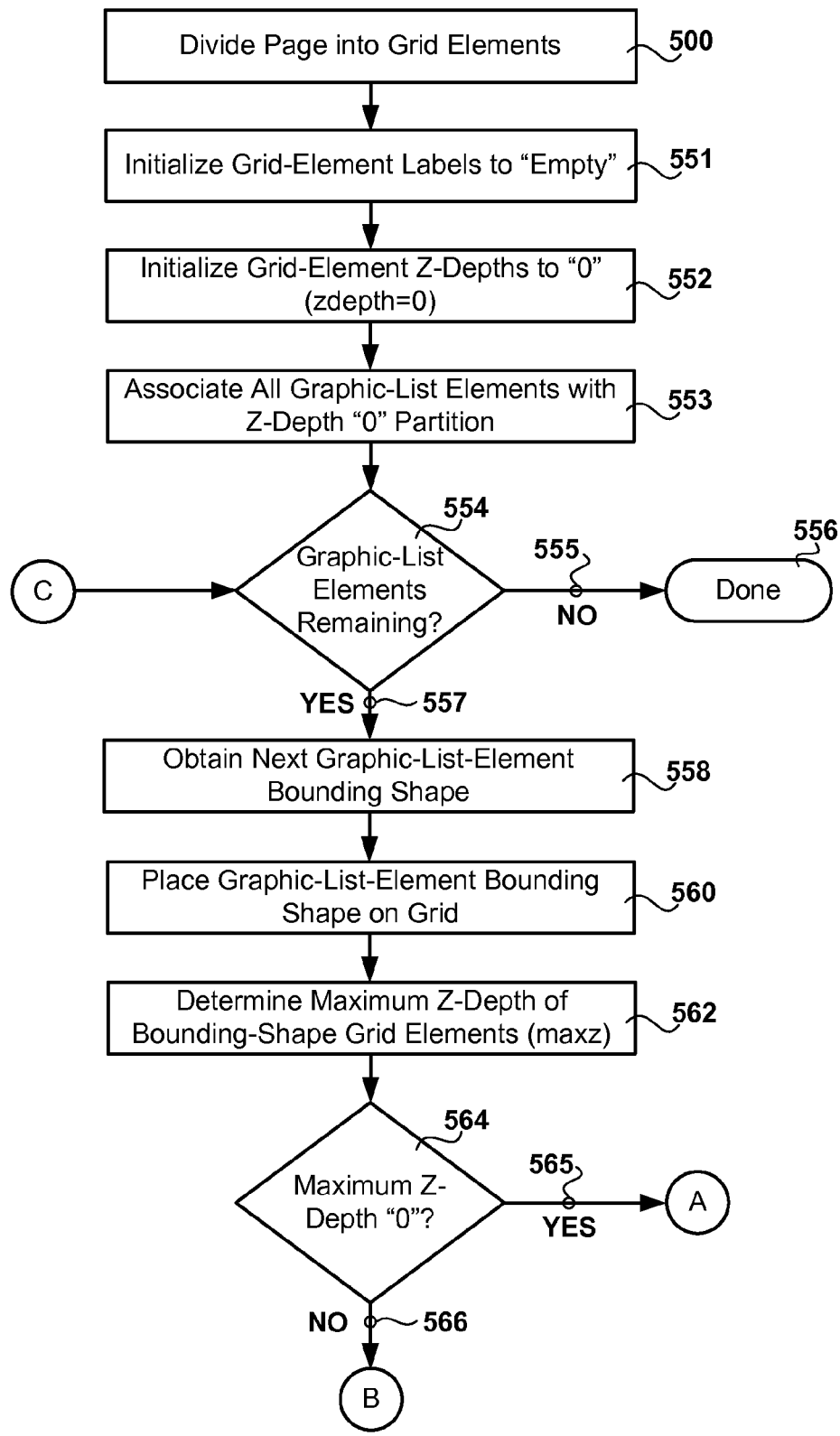
FIG. 19 is a chart showing exemplary embodiments of the present invention comprising using a grid page to determine partitions based on z-depth.
Figure 19:
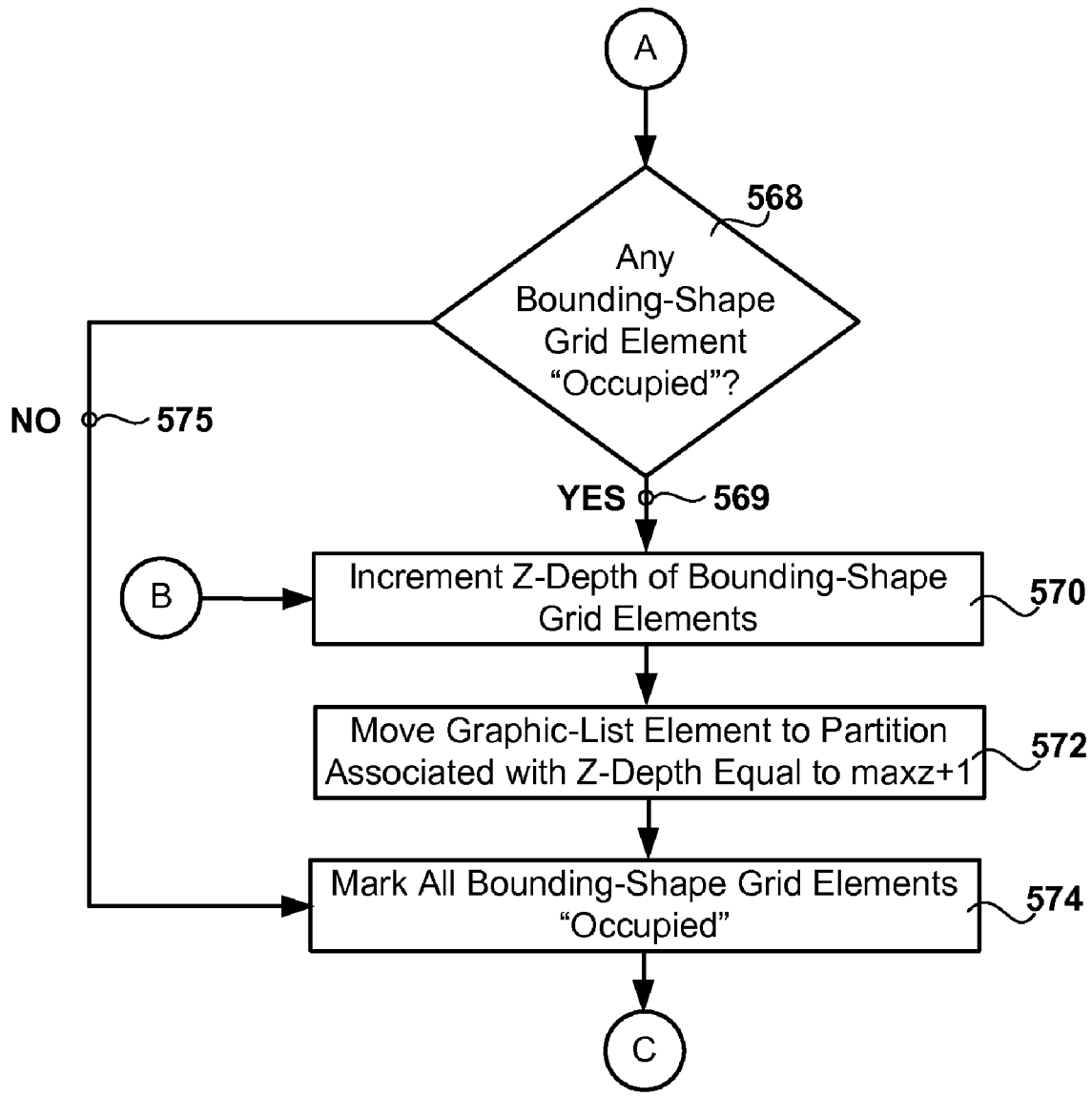

In some embodiments of the present invention comprising "by-z-depth" partitioning, grid elements and bounding-shape approximations of graphic-list elements may be used to partition a graphic list. In exemplary embodiments described in relation to FIG. 19, a page may be divided 500 into grid elements. A grid element may initially 551 be associated with an "empty" label indicating that no bounding shape associated with a graphic-list element overlaps the grid element. The z-depth of a grid element may be initialized 552 to zero, and all graphic-list elements may be associated 553 with a partition that is associated with zero z-depth. The graphic list may be examined to determine 554 if there are remaining unexamined graphic-list elements. If all graphic-list elements have been examined 555, then the partitioning process may terminate 556. If there are 557 unexamined graphic-list elements, the next graphic-list-element bounding shape may be obtained 558 and placed 560 on the page grid. The maximum z-depth of the bounding-shape grid elements may be determined 562, and if the maximum z-depth is 565 zero, then a test 568 to determine if any bounding-shape grid element is marked "occupied" may be made. If no bounding-shape grid elements are marked "occupied" 575, then all bounding-shape grid elements may be marked 574 "occupied," and the graphic-list may be examined 554 to determine if there are unexamined graphic-list elements remaining. If a bounding-shape grid element is marked "occupied" 569, then the z-depth associated with each bounding-shape grid element may be incremented 570. The graphic-list element 572 may be moved to a partition associated with the newly incremented maximum z-depth of the bounding-shape grid elements. All bounding-shape grid elements may be marked 574 "occupied," and the graphic-list may be examined 554 to determine if there are unexamined graphic-list elements remaining. If the maximum z-depth was determined not to be zero 566, then the z-depth associated with each bounding-shape grid element may be incremented 570. The graphic-list element 572 may be moved to a partition associated with the newly incremented maximum z-depth of the bounding-shape grid elements. All bounding-shape grid elements may be marked 574 "occupied," and the graphic-list may be examined 554 to determine if there are unexamined graphic-list elements remaining.

In some embodiments of the present invention comprising a host computing device, the host computing device may comprise one or more central processing units (CPUs), multi-core CPUs, graphics processing unit (GPU) cards, digital signal processing (DSP) engines and hardware accelerator ASICs. In some embodiments of the present invention comprising a printer controller, the printer controller may comprise one more CPUs, multi-core CPUs, GPUs, DSP engines and hardware accelerator ASICs.

Figure 20:
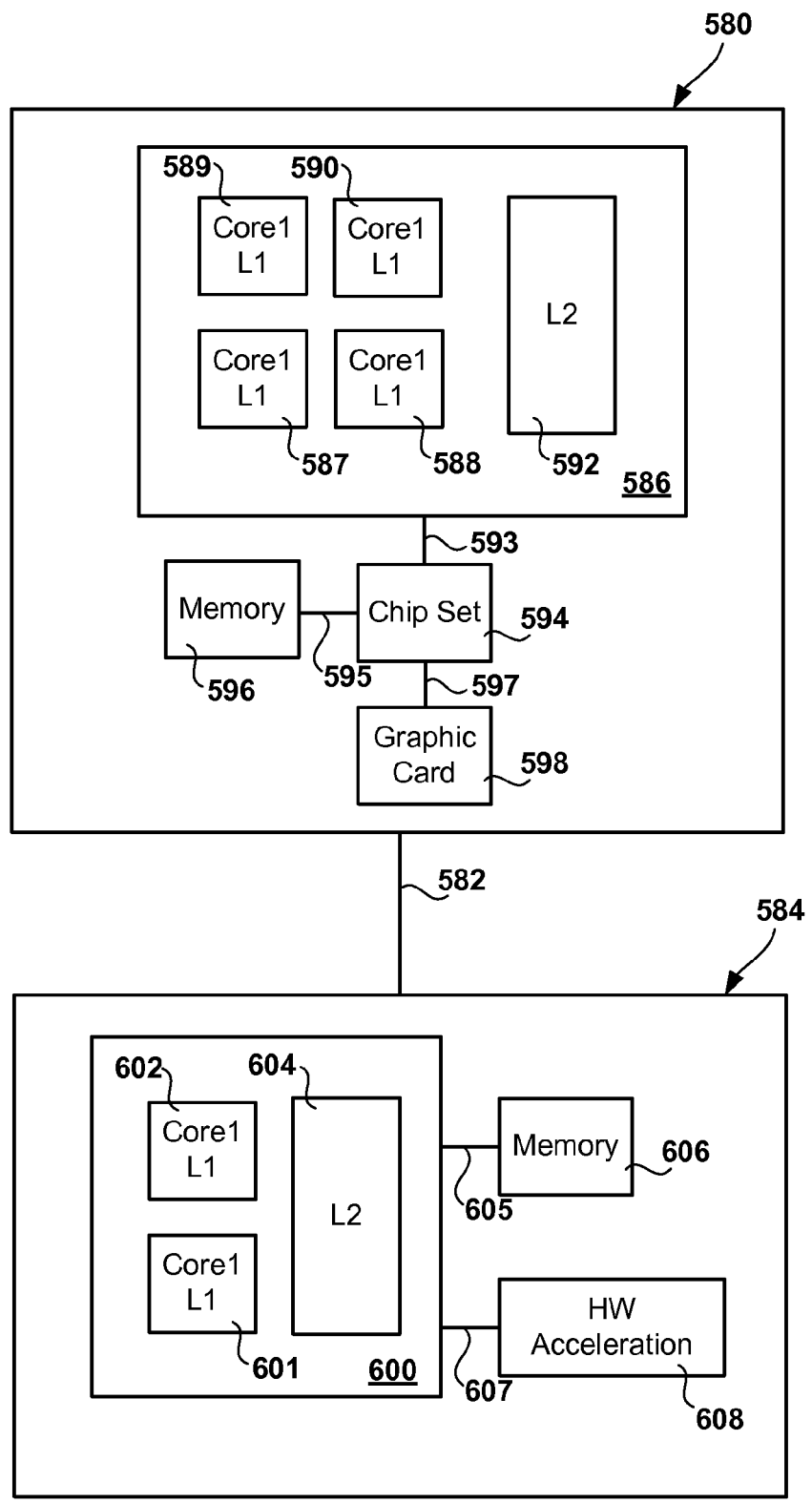
FIG. 20 is a picture showing an exemplary multi-core system in which some embodiments of the present invention may operate.

In some embodiments of the present invention, multiple processing units within the host computing device may be used to concurrently render print-data partitions. In some embodiments of the present invention, multiple processing units within the host computing device may be used to concurrently bit-blit rendered partitions. In some embodiments of the present invention, multiple processing units within the printer controller may be used to concurrently render print-data partitions. In some embodiments of the present invention, multiple processing units within the printer controller may be used to concurrently bit-blit rendered partitions. One exemplary printing environment may be described in relation to FIG. 20. A host computing device 580 may be communicatively coupled 582 to a printer controller 584. The host computing device 580 may comprise a multi-core CPU 586 comprising four 587-589 processing cores and L2 cache 592.

The multi-core CPU 586 may operatively coupled 593 with a chip set 594 operatively coupled 595, 597 to memory 596 and a graphic card 598. The printer controller 584 may comprise a multi-core embedded CPU 600 comprising two cores 601, 602 and L2 cache 604. The multi-core embedded CPU 600 may be operatively coupled 605, 607 to memory 606 and hardware acceleration 608.

In some embodiments of the present invention, rendering of partitions may be distributed among CPUs in the same network, for example, in cloud computing. In some embodiments of the present invention, bit-blitting of rendered partitions may be distributed among CPUs in the same network, for example, in cloud computing.

Figure 21:
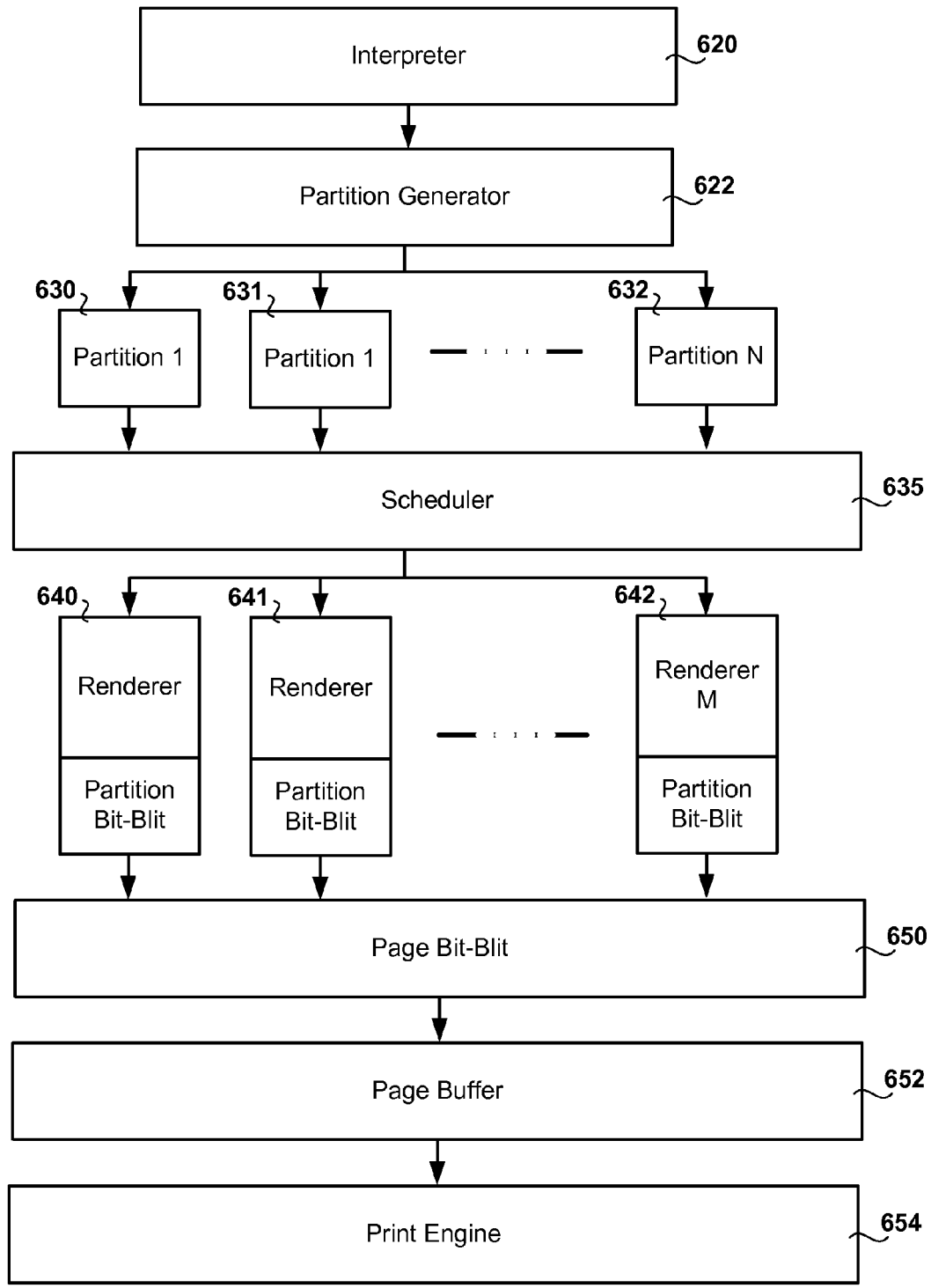
FIG. 21 is a picture showing exemplary embodiments of the present invention comprising a partition-renderer scheduler for associating partitions with a renderer.

Some embodiments of the present invention described in relation to FIG. 21 may comprise an interpreter 620 that generates a graphic list which may be partitioned by a partition generator 622 into a plurality of partitions 630, 631, 632. A scheduler 635 may assign a partition to a renderer 640, 641, 642 based on renderer availability and other factors. Exemplary factors comprise partition type, partition complexity, partition size, number of objects in a partition, partition operations and other partition features and factors. A renderer 640, 641, 642 may render a received partition and may bit-blit the rendered partition. The bit-blitted rendered partitions may be bit-blit 650 to a page buffer 652 which may be sent to a print engine 654. Depending on the partitioning, the page bit-blit 650 may be "out-of-order" or "in-order." Partitions which may be bit-blit "out-of-order" may be bit-blit directly to the page buffer without intermediate partition bit-blitting.

In some embodiments of the present invention, a host computing device may comprise an interpreter 620, a partition generator 622 and a scheduler 635. In some of these embodiments, the renderers 640, 641, 642 may be distributed across the host computing device and a print controller embedded in a printing device. The printing device may comprise a page bit-blit 650, a page buffer 652 and an engine 654 interface in the embedded controller. In alternative embodiments, the renderers 640, 641, 642 may reside on the host computing device. In yet alternative embodiments, the renderers 640, 641, 642 may reside on the embedded controller.

Figure 22:
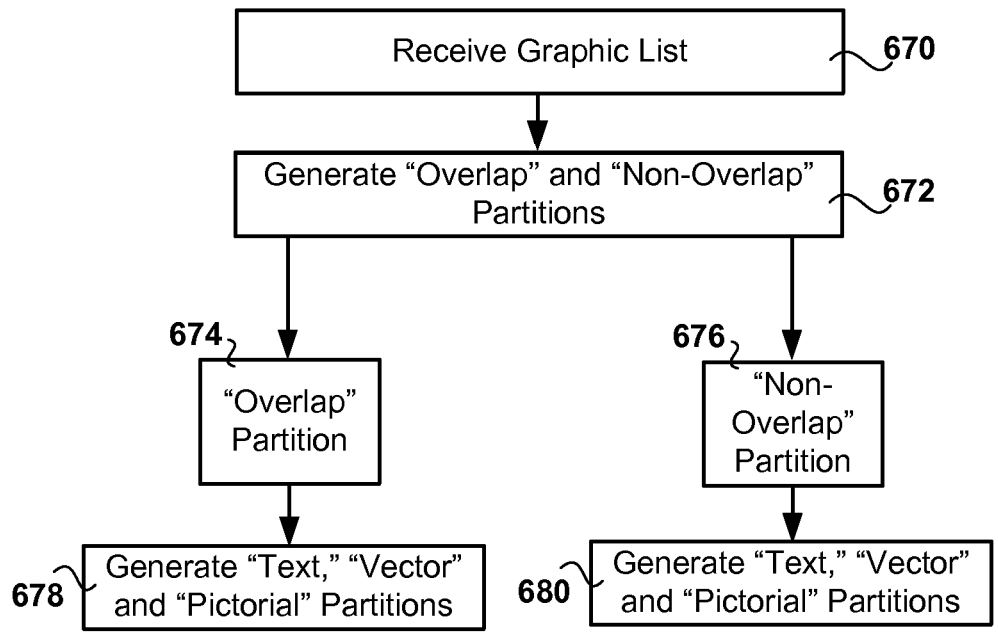
FIG. 22 is a chart showing exemplary embodiments of the present invention comprising exemplary cascaded partitioning.
Figure 23:
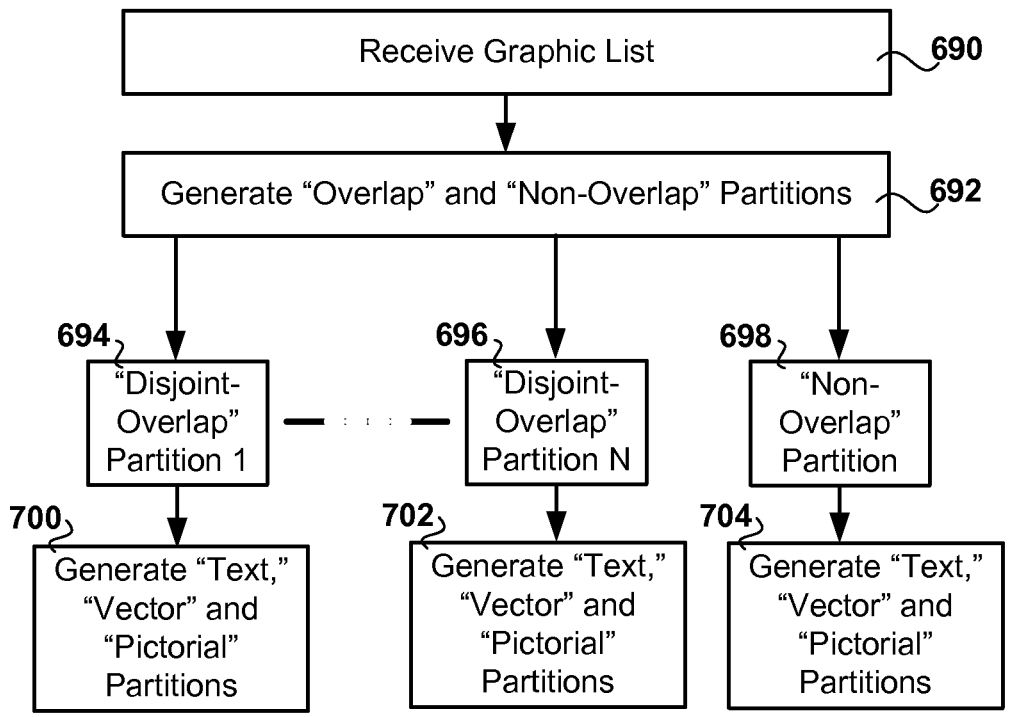
FIG. 23 is a chart showing exemplary embodiments of the present invention comprising exemplary cascaded partitioning.

Some embodiments of the present invention may comprise cascaded partitioning. FIG. 22 and FIG. 23 depict exemplary embodiments of the present invention comprising cascaded partitioning. In an exemplary embodiment shown in FIG. 22, a graphic list may be received 670 and an "overlap" partition 674 and a "non-overlap" partition 676 may be generated 672 using "by-overlap" partitioning. The "overlap" partition 674 may be further partitioned 678 into "text," "vector," and "pictorial" partitions using "by-object-run" partitioning. The "non-overlap" partition 676 may be further partitioned 680 into "text," "vector," and "pictorial" partitions using "by-object-run" partitioning.

In an exemplary embodiment shown in FIG. 23, a graphic list may be received 690 and a "non-overlap" partition 698 and a plurality 694, 696 of disjoint "overlap" partitions may be generated 692 using "by-disjoint-overlap" partitioning. The "non-overlap" partition 698 and the plurality 694, 696 of disjoint "overlap" partitions may be further partitioned 700, 702, 704 using "by-object-run" partitioning. In these embodiments, final, object-type partitions may be rendered by a renderer associated with the object type associated with the partition, and the final partitions associated with the "non-overlap" partition and the final partitions associated with each disjoint "overlap" partition may be bit-blit concurrently. The "non-overlap" object-type partitions may be bit-blit concurrently also. However, the object-type partitions within each disjoint "overlap" partition must be bit-blit sequentially.

Figure 24:
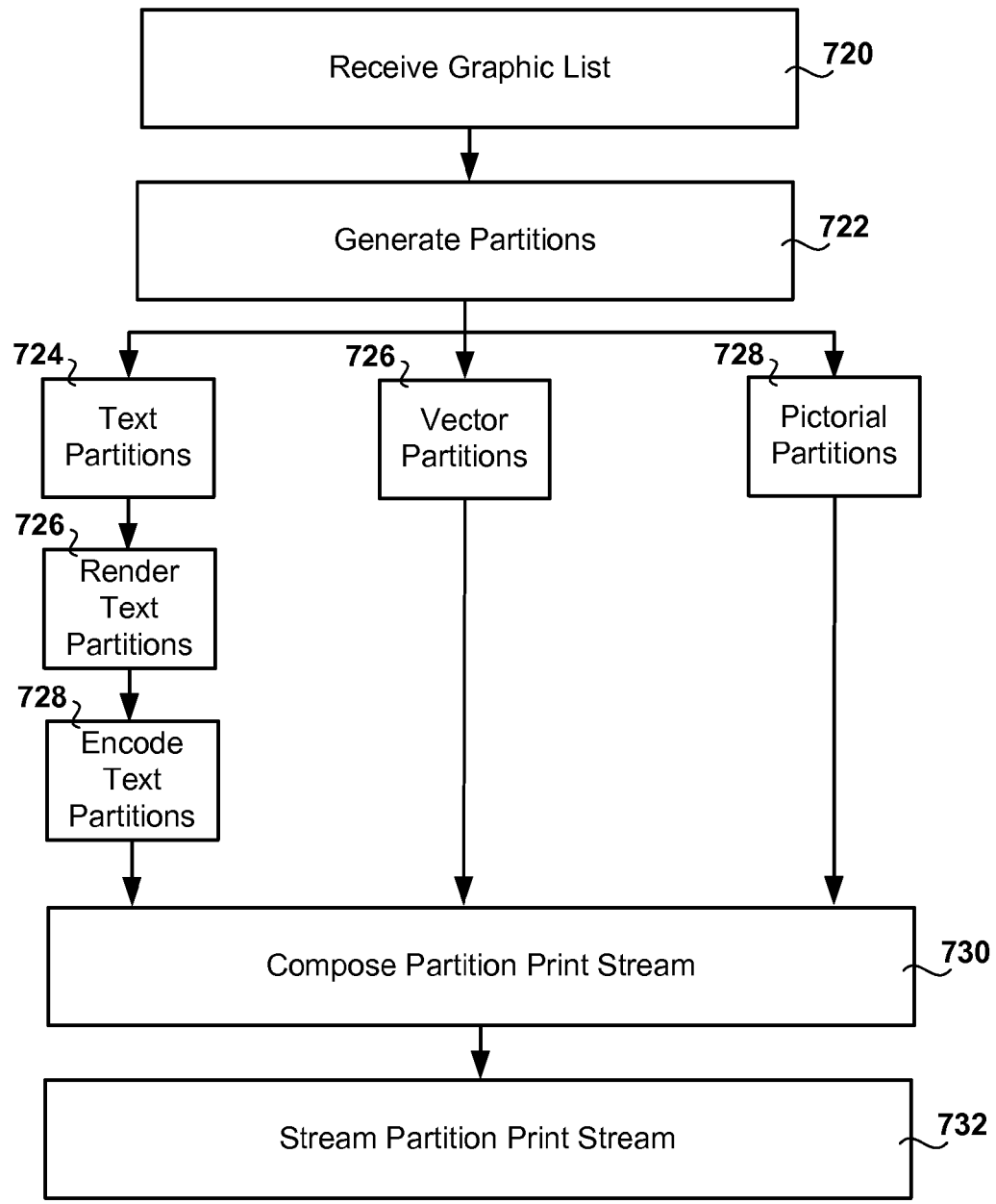
FIG. 24 is a chart showing exemplary embodiments of the present invention comprising encoding text partitions at a printer driver according to embodiments of the present invention.

Some embodiments of the present invention described in relation to FIG. 24 may comprise, in a host computing device, receiving 720 a graphic list, and generating 722 graphic-list partitions according to "by-object-run" partitioning described herein. The graphic-list partitions may comprise text partitions 724, vector partitions 726 and pictorial partitions 728. The text partitions 724 may be rendered 726 on one or more specialized text renderers. The rendered text partitions may be encoded 728, and a partition print stream may be composed 730 from the encoded text partitions, the vector partitions 726 and the pictorial partitions 728. The partition print stream may be transmitted 732 to a printer controller. In some embodiments, a partition print stream may comprise a partition file.

Some raster image processors (RIPs) may split object lists into very small objects, especially image or pictorial objects. In alternative embodiments, a pictorial partition may be parsed to determine if multiple, small objects may be combined to form one larger pictorial object. In these embodiments, this pictorial partition processing may be done prior to sending the pictorial partition to the partition file composer.

Figure 25:
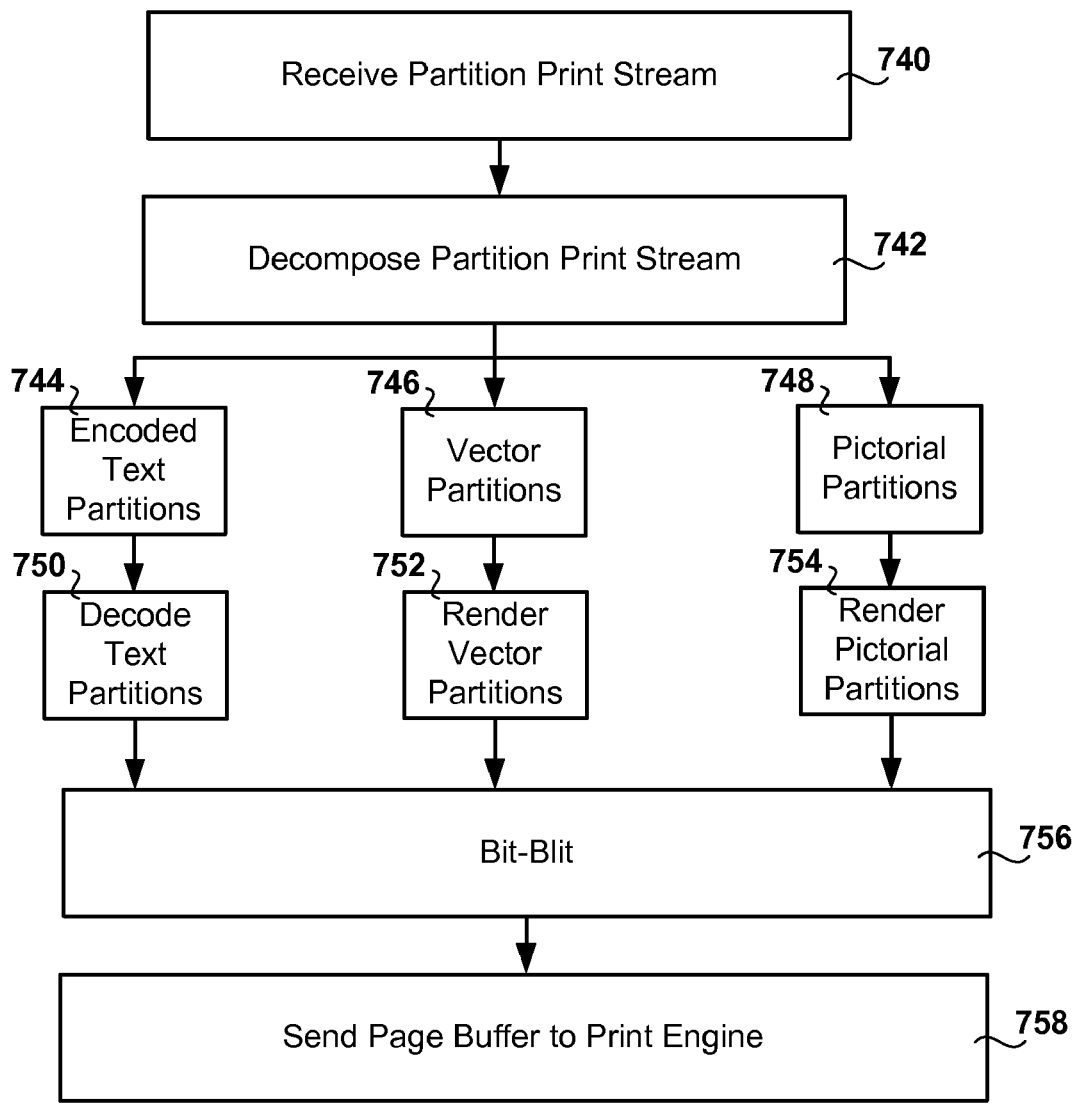
FIG. 25 is a chart showing exemplary embodiments of the present invention comprising decoding text partitions at a printer controller according to embodiments of the present invention.

Some embodiments of the present invention described in relation to FIG. 25 may comprise receiving 740 a partition print stream at a print controller, and decomposing 742 the partition print stream into encoded text partitions 744, vector partitions 746 and pictorial partitions 748. In some embodiments, a partition print stream may comprise a partition file. The encoded text partitions 744 may be decoded to reconstruct the rendered text partitions. The vector partitions 746 and the pictorial partitions 748 may be rendered on one or more specialized renderers. The reconstructed rendered text partitions, the rendered vector partitions and the rendered pictorial partitions may be bit-blit 756 to a page buffer which may be sent 758 to a print engine. The rendered partitions must be bit-blit 756 sequentially according to the partition order associated with each partition.

In some embodiments of the present invention, rendered text partitions may be encoded using binary compression methods, for example, but not limited to, JBIG (Joint Bi-level Image Expert Group), JBIG2, MR (Modified Read), MMR (Modified Modified Read) and other bi-level encoding methods.

Figure 26:
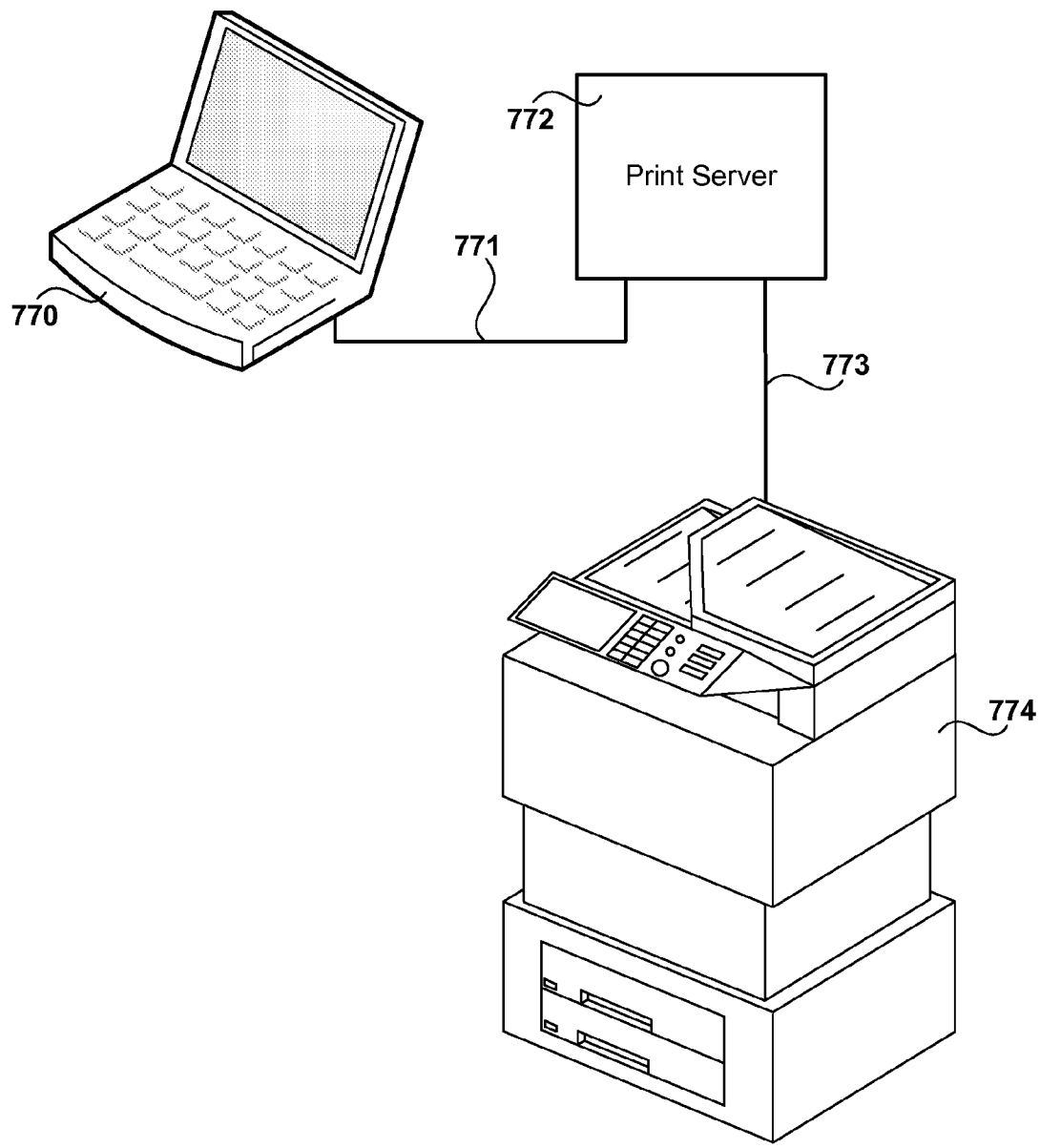
FIG. 26 is a picture showing an exemplary printing system, in which some embodiments of the present invention may operate, comprising a host computing system communicatively coupled with a print server communicatively coupled with a printing device.
Figure 27:
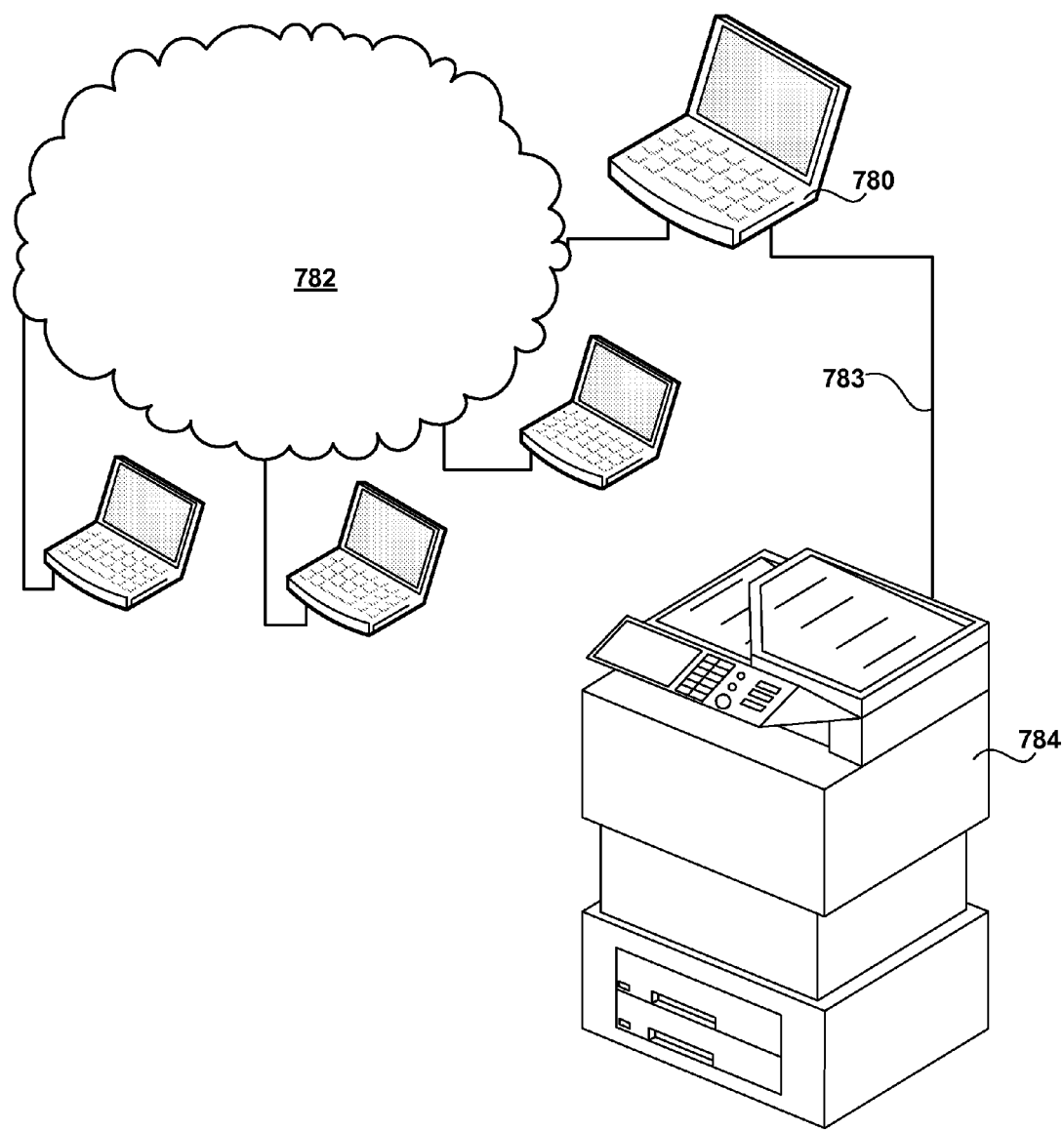
FIG. 27 is a picture showing an exemplary printing system, in which some embodiments of the present invention may operate, comprising a host computing system, which is part of a cloud computing environment, communicatively coupled with a printing device.

Exemplary embodiments of the present invention described in relation to FIG. 26 may comprise a host computing device 770 communicatively coupled 771 to a print server 772. The print server may be communicatively coupled 773 to an imaging device 774. Alternative embodiments of the present invention described in relation to FIG. 27 may comprise a host computing device 780 which is part of a cloud computing environment 782. The host computing device 780 may be communicatively coupled 783 to an imaging device 784. Yet alternative embodiments of the present invention described in relation to FIG. 28 may comprise a host computing device 790 which is part of a cloud computing environment 792. The host computing device 790 may be communicatively coupled 793 to a print server 794 which is communicatively coupled 795 to an imaging device 796.

In some embodiments of the present invention comprising a print server, the print server may comprise one or more central processing units (CPUs), multi-core CPUs, graphics processing unit (GPU) cards, digital signal processing (DSP) engines and hardware accelerator ASICs. In some embodiments of the present invention, multiple processing units within the print server may be used to concurrently render print-data partitions. In some embodiments of the present invention, multiple processing units within the print server may be used to concurrently bit-blit rendered partitions.

In some embodiments of the present invention, functionality and systems described above in relation to a host computing device may alternatively reside on a print server.

For example, in some embodiments of the present invention described in relation to FIG. 21, a print server may comprise an interpreter 620, a partition generator 622 and a scheduler 635. In some of these embodiments, the renderers 640, 641, 642 may be distributed across a host computing device, the print server and a print controller embedded in a printing device. The printing device may comprise a page bit-blit 650, a page buffer 652 and an engine 654 interface in the embedded controller. In alternative embodiments, the renderers 640, 641, 642 may reside on the host computing device. In yet alternative embodiments, the renderers 640, 641, 642 may reside on the embedded controller. In still alternative embodiments, the renderers 640, 641, 642 may reside on the print server.

For example, some embodiments of the present invention described in relation to FIG. 24 may comprise, in a print server, receiving 720 a graphic list, and generating 722 graphic-list partitions according to "by-object-run" partitioning described herein. The graphic-list partitions may comprise text partitions 724, vector partitions 726 and pictorial partitions 728. The text partitions 724 may be rendered 726 on one or more specialized text renderers. The rendered text partitions may be encoded 728, and a partition print stream may be composed 730 from the encoded text partitions, the vector partitions 726 and the pictorial partitions 728. The partition print stream may be transmitted 732 to a printer controller. In some embodiments, a partition print stream may comprise a partition file.

Some embodiments of the present invention described in relation to FIG. 29 may comprise receiving a graphic list 800 and receiving renderer information 802. Exemplary renderer information may comprise a list of renderers and associated renderer information, for example, availability, location, status, type, average throughput, maximum speed, and other renderer attributes and information. In some embodiments, renderer information may be stored in a central storage location in a print system accessible to any renderer in the print system, and a renderer may update its associated information periodically. The renderer information may be received 802 from the central storage location. In alternative embodiments, renderer information may be received 802 in response to a query to a renderer. In still alternative embodiments, renderer information may be received 802 from a renderer manager that may register available renderers. In yet alternative embodiments, a fixed database of renderers and renderer attributes may be maintained.

Partitions may be generated 804 according to one or more partition-generating paradigms described herein, and the generated partitions may be processed 806. In some embodiments of the present invention, partitions may be processed 806 in relation to available rendering resources for optimal rendering performance. In some embodiments, a first partition and a second partition may be merged, or otherwise combined, based on the number of objects in the partitions, the complexity of the objects in the partitions, an estimate of the processing time associated with the partitions, or other partition attributes. In alternative embodiments, a first partition may be split into sub-partitions based on the number of objects in the partition, the complexity of the objects in the partition, an estimate of the processing time associated with the partition, or other partition attributes. In some embodiments of the present invention, partitions may be processed 806 according to predetermined partition constraints. Exemplary partition constraints may comprise partition size, partition complexity, partition area, partition processing time and other partition constraints. A partition resulting from the partition processing 806 may be associated 808 with a renderer. In some embodiments of the present invention, the association 808 may be based on the renderer information.

In some embodiments of the present invention, during partition generation, a partition status indicator associated with a partition may be monitored. When a partition status indicator meets a first criterion, no additional graphic-list elements may be added to the, now unavailable, partition. A new partition may be formed of the same partition type, and graphic-list elements that would have been added to the unavailable partition may be added to the new partition.

An exemplary partition status indicator may be associated with the number of graphical objects in a partition. In some exemplary embodiments of the present invention, an upper limit of the number of graphical objects allowed in a partition may be set. In these embodiments, if a partition is determined to be full, when the next graphic-list element that would have been assigned to the full partition is encountered, a new partition may be formed, and the graphic-list element may be added to the new partition. For example, in "by-object-run" partitioning, a run of graphic-list elements exceeding in number the upper limit may be assigned to multiple partitions. In "by-overlap" partitioning, for example, if the number of graphical objects which do not overlap other objects and are not overlapped by other objects exceeds the upper limit, then multiple "non-overlap" partitions may be generated.

Other exemplary partition status indicators may be indicators associated with the number of graphical objects of a first graphical-object type in a partition, the complexity of the graphical objects in a partition, the estimated rendering time of a partition and other partition characteristics or attributes.

In some embodiments of the present invention, all partitions associated with a graphic list may be generated prior to transmission of any partition to an associated renderer. In alternative embodiments of the present invention, a partition may be sent to an associated renderer prior to completion of partition generation. For example, in some embodiments of the present invention comprising "by-object-run" partitioning, a first partition may be sent to an associated renderer at any time after the next partition has been formed, indicating the run associated with the first partition is complete. In some embodiments of the present invention, for example, an unavailable partition may be sent to an associated renderer prior to completion of the partition generation.

The herein described printing system configurations are intended as exemplary printing system configurations and not as limitations on the embodiments of the present invention.

TABLE 3

Exemplary Page Grid Labels Associated with Exemplary Page Grid 390 Shown in FIG. 17

| Grid Element | Initially | Object1 391 | Object2 392 | Object3 393 | Object4 394 | Object5 395 | Object6 396 |
|---|---|---|---|---|---|---|---|
| 401 | empty | occupied | occupied | occupied | occupied | occupied | occupied |
| 402 | empty | occupied | occupied | occupied | occupied | occupied | occupied |
| 403 | empty | occupied | occupied | occupied | occupied | occupied | occupied |
| 404 | empty | occupied | overlap | overlap | overlap | overlap | overlap |
| 405 | empty | occupied | overlap | overlap | overlap | overlap | overlap |
| 406 | empty | occupied | overlap | overlap | overlap | overlap | overlap |
| 407 | empty | occupied | occupied | occupied | occupied | occupied | occupied |
| 408 | empty | occupied | occupied | occupied | occupied | occupied | occupied |
| 409 | empty | occupied | occupied | overlap | overlap | overlap | overlap |
| 410 | empty | occupied | overlap | overlap | overlap | overlap | overlap |
| 411 | empty | occupied | overlap | overlap | overlap | overlap | overlap |
| 412 | empty | occupied | overlap | overlap | overlap | overlap | overlap |
| 413 | empty | occupied | occupied | occupied | occupied | occupied | occupied |
| 414 | empty | occupied | occupied | occupied | occupied | occupied | occupied |
| 415 | empty | occupied | occupied | overlap | overlap | overlap | overlap |
| 416 | empty | occupied | overlap | overlap | overlap | overlap | overlap |
| 417 | empty | occupied | overlap | overlap | overlap | overlap | overlap |
| 418 | empty | occupied | overlap | overlap | overlap | overlap | overlap |
| 419 | empty | empty | empty | empty | empty | empty | empty |
| 420 | empty | empty | empty | empty | empty | empty | empty |
| 421 | empty | empty | empty | empty | empty | occupied | occupied |
| 422 | empty | empty | empty | empty | empty | occupied | occupied |
| 423 | empty | empty | empty | empty | empty | occupied | occupied |
| 424 | empty | empty | empty | empty | occupied | occupied | occupied |
| 425 | empty | empty | empty | empty | empty | empty | empty |
| 426 | empty | empty | empty | empty | empty | empty | occupied |
| 427 | empty | empty | empty | empty | empty | occupied | overlap |
| 428 | empty | empty | empty | empty | empty | occupied | overlap |
| 429 | empty | empty | empty | empty | empty | occupied | occupied |
| 430 | empty | empty | empty | empty | occupied | occupied | occupied |
| 431 | empty | empty | empty | empty | empty | empty | empty |
| 432 | empty | empty | empty | empty | empty | empty | occupied |
| 433 | empty | empty | empty | empty | empty | empty | occupied |
| 434 | empty | empty | empty | empty | empty | empty | occupied |
| 435 | empty | empty | empty | empty | empty | empty | empty |
| 436 | empty | empty | empty | empty | empty | empty | empty |

TABLE 4

Exemplary Objects Associated with Exemplary Page Grid 390 Shown in FIG. 17

| Grid Element | Initially | Object1 391 | Object2 392 | Object3 393 | Object4 394 | Object5 395 | Object6 396 |
|---|---|---|---|---|---|---|---|
| 401 | null | 1 | 1 | 1 | 1 | 1 | 1 |
| 402 | null | 1 | 1 | 1 | 1 | 1 | 1 |
| 403 | null | 1 | 1 | 1 | 1 | 1 | 1 |
| 404 | null | 1 | 1, 2 | 1, 2 | 1, 2 | 1, 2 | 1, 2 |
| 405 | null | 1 | 1, 2 | 1, 2 | 1, 2 | 1, 2 | 1, 2 |
| 406 | null | 1 | 1, 2 | 1, 2 | 1, 2 | 1, 2 | 1, 2 |
| 407 | null | 1 | 1 | 1 | 1 | 1 | 1 |
| 408 | null | 1 | 1 | 1 | 1 | 1 | 1 |
| 409 | null | 1 | 1 | 1, 3 | 1, 3 | 1, 3 | 1, 3 |
| 410 | null | 1 | 1, 2 | 1, 2, 3 | 1, 2, 3 | 1, 2, 3 | 1, 2, 3 |
| 411 | null | 1 | 1, 2 | 1, 2, 3 | 1, 2, 3 | 1, 2, 3 | 1, 2, 3 |
| 412 | null | 1 | 1, 2 | 1, 2, 3 | 1, 2, 3 | 1, 2, 3 | 1, 2, 3 |
| 413 | null | 1 | 1 | 1 | 1 | 1 | 1 |
| 414 | null | 1 | 1 | 1 | 1 | 1 | 1 |
| 415 | null | 1 | 1 | 1, 3 | 1, 3 | 1, 3 | 1, 3 |
| 416 | null | 1 | 1, 2 | 1, 2, 3 | 1, 2, 3 | 1, 2, 3 | 1, 2, 3 |
| 417 | null | 1 | 1, 2 | 1, 2, 3 | 1, 2, 3 | 1, 2, 3 | 1, 2, 3 |
| 418 | null | 1 | 1, 2 | 1, 2, 3 | 1, 2, 3 | 1, 2, 3 | 1, 2, 3 |
| 419 | null | null | null | null | null | null | null |
| 420 | null | null | null | null | null | null | null |
| 421 | null | null | null | null | null | 5 | 5 |
| 422 | null | null | null | null | null | 5 | 5 |
| 423 | null | null | null | null | null | 5 | 5 |
| 424 | null | null | null | null | 4 | 4 | 4 |
| 425 | null | null | null | null | null | null | null |
| 426 | null | null | null | null | null | null | 6 |
| 427 | null | null | null | null | null | 5 | 5, 6 |
| 428 | null | null | null | null | null | 5 | 5, 6 |
| 429 | null | null | null | null | null | 5 | 5 |
| 430 | null | null | null | null | 4 | 4 | 4 |
| 431 | null | null | null | null | null | null | null |
| 432 | null | null | null | null | null | null | 6 |
| 433 | null | null | null | null | null | null | 6 |
| 434 | null | null | null | null | null | null | 6 |
| 435 | null | null | null | null | null | null | null |
| 436 | null | null | null | null | null | null | null |

TABLE 5

Exemplary Overlap Lists Associated with Exemplary Page Grid 390 Shown in FIG. 17

| Object | Initially | Object1 391 | Object2 392 | Object3 393 | Object4 394 | Object5 395 | Object6 396 |
|---|---|---|---|---|---|---|---|
| Object1 391 | null | null | 2 | 2, 3 | 2, 3 | 2, 3 | 2, 3 |
| Object2 392 | null | null | 1 | 1, 3 | 1, 3 | 1, 3 | 1, 3 |
| Object3 393 | null | null | null | 1, 2 | 1, 2 | 1, 2 | 1, 2 |
| Object4 394 | null | null | null | null | null | null | null |
| Object5 395 | null | null | null | null | null | null | 6 |
| Object6 396 | null | null | null | null | null | null | 5 |

The preceding description is not intended to be exhaustive or to limit the invention to any precise form disclosed. Many modifications and variations are possible in light of the above teaching.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method, in a printing system, for rendering a print job, said method comprising:
receiving, associated with a print job, a graphic list comprising a first graphic-list element, an immediately previous graphic-list element and an immediately subsequent graphic-list element;
assigning said first graphic-list element to a first partition, wherein said first partition is a partition associated with said immediately previous graphic-list element when a first graphical-object type associated with said first graphic-list element is the same as a third graphical-object type associated with said immediately previous graphic-list element and said first partition is a newly created partition, not associated with said immediately previous graphic-list element, when said first graphical-object type is not the same as said third graphical-object type;
comparing said first graphical-object type with a second graphical-object type associated with said immediately subsequent graphic-list element;
when said first graphical-object type and said second graphical-object type are the same, assigning said immediately subsequent graphic-list element to said first partition; and
when said first graphical-object type and said second graphical-object type are not the same, creating a second partition and assigning said immediately subsequent graphic-list element to said second partition.

2. The method as described in claim 1, wherein said first graphical-object type is a type selected from the group consisting of text graphical object, vector graphical object and pictorial graphical object.

3. The method as described in claim 1 further comprising associating said first graphical-object type with said first partition.

4. The method as described in claim 1 further comprising associating said first partition with a first renderer, wherein said first renderer is a first specialized renderer associated with said first graphical-object type.

5. The method as described in claim 4, wherein said first graphical-object type is a type selected from the group consisting of text graphical object, vector graphical object and pictorial graphical object.

6. The method as described in claim 4 further comprising associating said second partition with a second renderer, wherein said second renderer is a second specialized renderer associated with said second graphical-object type.

7. The method as described in claim 6 further comprising:
rendering said first partition on said first specialized renderer; and
rendering said second partition on said second specialized renderer.

8. The method as described in claim 7, wherein said rendering said first partition and said rendering said second partition occur substantially concurrently.

9. The method as described in claim 1 further comprising associating a first partition order with said first partition.

10. The method as described in claim 9 further comprising associating a second partition order with said second partition, wherein said first partition order and said second partition order indicate that said first partition be bit-blit prior to said second partition.

* * * * *